(12) United States Patent
Mizuno et al.

(10) Patent No.: US 10,290,900 B2
(45) Date of Patent: May 14, 2019

(54) NON-AQUEOUS ELECTROLYTIC SOLUTION AND LITHIUM ION SECONDARY BATTERY COMPRISING SAME

(71) Applicant: NIPPON SHOKUBAI CO., LTD., Osaka (JP)

(72) Inventors: Hiroyuki Mizuno, Osaka (JP); Takayuki Kobatake, Osaka (JP); Hiromoto Katsuyama, Osaka (JP); Shin-ya Shibata, Osaka (JP); Takeo Kawase, Osaka (JP); Kazuhisa Hirata, Osaka (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 0 days.

(21) Appl. No.: 15/127,058

(22) PCT Filed: Mar. 25, 2015

(86) PCT No.: PCT/JP2015/059261
§ 371 (c)(1),
(2) Date: Sep. 19, 2016

(87) PCT Pub. No.: WO2015/147110
PCT Pub. Date: Oct. 1, 2015

(65) Prior Publication Data
US 2017/0117582 A1      Apr. 27, 2017

(30) Foreign Application Priority Data

Mar. 25, 2014 (JP) ................. 2014-062796
Sep. 11, 2014 (JP) ................. 2014-185685
Mar. 5, 2015 (JP) ................. 2015-044091

(51) Int. Cl.
*H01M 10/0567* (2010.01)
*H01M 10/0525* (2010.01)
*H01M 10/0569* (2010.01)
*H01M 10/0568* (2010.01)

(52) U.S. Cl.
CPC ... *H01M 10/0567* (2013.01); *H01M 10/0525* (2013.01); *H01M 10/0569* (2013.01); *H01M 10/0568* (2013.01); *H01M 2300/0028* (2013.01)

(58) Field of Classification Search
CPC ......... H01M 10/0567; H01M 10/0525; H01M 10/0569; H01M 2300/0028
See application file for complete search history.

(56) References Cited

U.S. PATENT DOCUMENTS

| | | | |
|---|---|---|---|
| 5,296,319 A | 3/1994 | Bito et al. | |
| 2010/0216034 A1* | 8/2010 | Odani | H01M 10/05 429/330 |
| 2011/0183218 A1* | 7/2011 | Odani | H01M 6/164 429/338 |
| 2012/0265385 A1* | 10/2012 | Funada | H01M 10/0525 701/22 |
| 2012/0316716 A1 | 12/2012 | Odani et al. | |
| 2017/0033402 A1 | 2/2017 | Kubota et al. | |

FOREIGN PATENT DOCUMENTS

| | | |
|---|---|---|
| JP | 2697365 | 1/1998 |
| JP | 2008-137117 | 6/2008 |
| JP | 2008-147117 | 6/2008 |
| JP | 2010-123265 | 6/2010 |
| JP | 2010-129449 | 6/2010 |
| JP | 4557381 | 10/2010 |
| JP | 2011-49153 | 3/2011 |
| JP | 2015-79636 | 4/2012 |
| JP | 2013-16456 | 1/2013 |
| JP | 2014-17250 | 1/2014 |
| JP | 2014-203748 | 10/2014 |
| JP | 2015-79636 | 4/2015 |
| WO | 2015/163139 | 10/2015 |

OTHER PUBLICATIONS

International Search Report dated May 19, 2015 in International (PCT) Application No. PCT/JP2015/059261.
Office Action dated Apr. 3, 2018 in Japanese Application No. 2014-185685, with English translation.
Notification of Reasons for Refusal dated Jun. 26, 2018 in Japanese Patent Application No. 2014-185685, with English Translation.
Notification of Reasons for Refusal dated Dec. 4, 2018 in Japanese Application No. 2015-063424, with English translation.
Decision of Refusal dated Jan. 22, 2019 in Japanese Patent Application No. 2014-185685, with English Translation.

* cited by examiner

Primary Examiner — Cynthia K Walls
(74) Attorney, Agent, or Firm — Wenderoth, Lind & Ponack, L.L.P.

(57) ABSTRACT

A non-aqueous electrolytic solution capable of suppressing reduction in capacity, cycle characteristics, and/or rate characteristics even when used under high voltage conditions after being stored under high temperature conditions (e.g., 60° C. or higher); and a lithium ion secondary battery using these non-aqueous electrolytic solutions are provided. The non-aqueous electrolytic solution of the present invention comprise an anion represented by the following general formula (1), a lithium cation, and a compound represented by the following general formula (2A) and/or an acid anhydride having an aromatic ring and at least one structure represented by —C(=O)—O—C(=O)— in a molecule, wherein a concentration of the anion represented by the general formula (1) is 0.1 mol/L or more.

11 Claims, No Drawings

NON-AQUEOUS ELECTROLYTIC SOLUTION AND LITHIUM ION SECONDARY BATTERY COMPRISING SAME

TECHNICAL FIELD

The present invention relates to a non-aqueous electrolytic solution and lithium ion secondary battery comprising same.

BACKGROUND ART

A lithium ion secondary battery is used as power supplies for smart phones or personnel computers, and as power supplies for automobiles. In the batteries used for these applications, investigations aimed at improving various characteristics, such as increase in power, increase in energy density, improvement of cycle characteristics or rate characteristics, are made.

There is a technology of using an additive as a technology which tries to improve characteristics of a lithium ion secondary battery in terms of an electrolytic solution. For example, Patent Document 1 proposes a technology in which an attention is given to an effect derived from anhydrides of sulfonic acid and carboxylic acid that a reductive decomposition of a non-aqueous solvent in charging is suppressed, by using this effect, a reduction in a high-load discharge capacity after being stored at 60° C. is suppressed. In Patent Document 2, monofluorophosphate and/or difluorophosphate, and sulfobenzoic acid are used in combination in order to improve low-temperature discharge characteristics and cycle characteristics. Patent Documents 3 and 4 propose a technology of suppressing a decomposition reaction of an electrolyte with use of sulfobenzoic anhydride or the like to enhance chemical stability of an electrolytic solution.

Patent Document 5 discloses a technology of suppressing deterioration of storage characteristics under high temperature by adding benzoic anhydride, phthalic anhydride or maleic anhydride to an electrolytic solution of a non-aqueous electrolytic solution secondary battery. Patent Document 4 proposes a technology in which low-temperature cycle characteristics of a battery are improved and chemical stability of an electrolytic solution is enhanced by using carboxylic anhydride such as succinic anhydride, glutaric anhydride or maleic anhydride in combination with a specific electrolyte salt.

PRIOR ART DOCUMENTS

Patent Documents

Patent document 1: Japanese Patent No. 4557381
Patent document 2: Japanese Unexamined Patent Application No. 2011-049153
Patent document 3: Japanese Unexamined Patent Application No. 2008-137117
Patent document 4: Japanese Unexamined Patent Application No. 2013-16456
Patent document 5: Japanese Patent No. 2697365

SUMMARY OF INVENTION

Technical Problem

As described above, various investigations have been made concerning improvement of battery characteristics, and a battery with a higher energy density is required in association of broadening of use. In order to increase an energy density of a battery, it is necessary to operate the battery under high voltage. However, when the battery is operated under high voltage conditions, there have been problems that the electrolytic solution is decomposed at the positive electrode, and a transition metal in the positive electrode active material is eluted to deteriorate cycle characteristics of the battery or rate characteristics of the battery. Further, these problems become remarkable particularly when the lithium ion secondary battery is stored under high temperature conditions.

Under these circumstances, the present invention has been made and an object thereof is to provide a non-aqueous electrolytic solution capable of suppressing reduction in capacity, and rate characteristics, or a non-aqueous electrolytic solution capable of suppressing reduction in capacity, cycle characteristics, and/or rate characteristics even when used under high voltage conditions after being stored under high temperature conditions (e.g., 60° C. or higher); and a lithium ion secondary battery using these non-aqueous electrolytic solutions.

Solutions to the Problems

The feature of a non-aqueous electrolytic solution of the present invention which could achieve the above-mentioned object lies in that the non-aqueous electrolytic solution comprises an anion represented by the following general formula (1); a lithium cation; a compound represented by the following general formula (2A); and/or an acid anhydride having an aromatic ring and at least one structure represented by —C(═O)—O—C(═O)— in a molecule, wherein the concentration of the anion represented by the general formula (1) is 0.1 mol/L or more.

$$[N(XSO_2)(FSO_2)]^-  \qquad (1)$$

(In the general formula (1), X represents a fluorine atom, an alkyl group having 1 to 6 carbon atoms or a fluoroalkyl group having 1 to 6 carbon atoms.)

[Chem. 1]

(2A)

(In the general formula (2A), $R^{13}$ and $R^{14}$ are the same or different and represent an organic group having 1 to 10 carbon atoms which may have a substituent, and $R^{13}$ and $R^{14}$ may be bonded to each other to form a ring, and Z represents O or NH.)

The non-aqueous electrolytic solution preferably contains, as an electrolyte salt, at least one compound selected from the group consisting of a compound represented by the following general formula (7), a compound represented by the following general formula (8), and lithium hexafluoroarsenate:

$$LiPF_l(C_mF_{2m+1})_{6-l} (0 \le l \le 6, 1 \le m \le 4) \qquad (7)$$

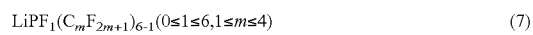

$$LiBF_n(C_oF_{2o+1})_{4-n} (0 \le n \le 4, 1 \le o \le 4) \qquad (8)$$

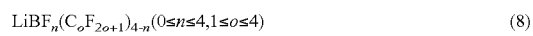

As the acid anhydride, a compound having a cyclic structure containing a structure represented by the above-mentioned —C(═O)—O—C(═O)—, and an intramolecular dehydrocondensation product of an aromatic polyhydric carboxylic acid is also preferably used as the acid anhydride.

It is recommended to use at least one compound selected from the group consisting of compounds represented by the following general formulas (2A-1) to (2A-5) as the compound represented by the general formula (2A).

[Chem. 2]

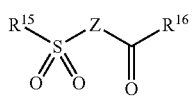
(2A-1)

(In the general formula (2A-1), $R^{15}$ and $R^{16}$ are the same or different and represent a monovalent organic group having 1 to 10 carbon atoms, and Z represents O or NH.)

[Chem. 3]

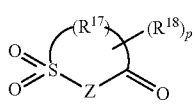
(2A-2)

(In the general formula (2A-2), $R^{17}$ represents a divalent hydrocarbon group or fluorohydrocarbon group having 3 to 10 carbon atoms, $R^{18}$ represents a halogen atom or an organic group having 1 to 5 carbon atoms, p represents an integer of 0 to 3, and Z represents O or NH.)

[Chem. 4]

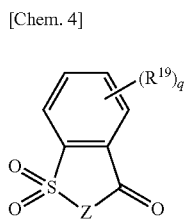
(2A-3)

(In the general formula (2A-3), $R^{19}$ represents a halogen atom or an organic group having 1 to 5 carbon atoms, q represents an integer of 0 to 4, and Z represents O or NH.)

[Chem. 5]

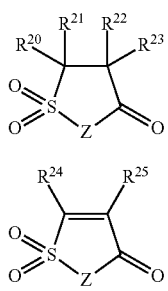
(2A-4)

(2A-5)

(In the general formulas (2A-4) and (2A-5), $R^{20}$ to $R^{25}$ are the same or different and represent a hydrogen atom, a halogen atom, or an organic group having 1 to 5 carbon atoms, and Z represents O or NH.)

The non-aqueous electrolytic solution of the present invention preferably contains the compound (2A) in an amount of 0.001% by mass or more and 5% by mass or less.

As the above-mentioned acid anhydride, a compound containing an aromatic ring having 6 to 10 carbon atoms is preferred.

Further, in the present invention, the non-aqueous electrolytic solution comprises a cyclic carbonate as a solvent, wherein a mole ratio of the cyclic carbonate to the whole lithium cations contained in the non-aqueous electrolytic solution (cyclic carbonate/$Li^+$) is preferably 1 or more and 5 or less.

Further, a preferred aspect of the present invention is a non-aqueous electrolytic solution comprising an anion represented by the above-mentioned general formula (1), a lithium cation, and a compound represented by the following general formula (2A'), wherein the concentration of the lithium cation is more than 1.1 mol/L.

[Chem. 6]

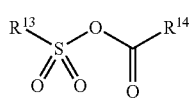
(2A')

(In the general formula (2A'), $R^{13}$ and $R^{14}$ are the same or different and represent an organic group having 1 to 10 carbon atoms which may have a substituent, and $R^{13}$ and $R^{14}$ may be bonded to each other to form a ring.)

A lithium ion secondary battery comprising the above-mentioned non-aqueous electrolytic solution also constitutes the present invention. A rated charge voltage of the lithium ion secondary battery of the present invention is preferably higher than 4.2 V.

Advantageous Effects of the Invention

The non-aqueous electrolytic solution of the present invention comprising the compound represented by the general formula (2A) exerts the effect of suppressing reductions in capacity and rate characteristics of a lithium ion secondary battery. Accordingly, according to the non-aqueous electrolytic solution, it is possible to provide a lithium ion secondary battery in which reductions in capacity and rate characteristics are suppressed.

Further, the non-aqueous electrolytic solution of the present invention comprising the acid anhydride exerts the effect of suppressing reductions in capacity and rate characteristics after storage under high temperature of a lithium ion secondary battery, and suppressing reductions in capacity retention ratio in a high-temperature cycle of a lithium ion secondary battery. Accordingly, according to the non-aqueous electrolytic solution, it is possible to provide a lithium ion secondary battery in which reductions in capacity, rate characteristics and cycle characteristics are suppressed.

DESCRIPTION OF EMBODIMENTS

1. Non-Aqueous Electrolytic Solution

The feature of a non-aqueous electrolytic solution of the present invention lies in that the non-aqueous electrolyte comprises an anion represented by the general formula (1): $[N(XSO_2)(FSO_2)]^-$ (in the general formula (1), X represents a fluorine atom, an alkyl group having 1 to 6 carbon atoms or a fluoroalkyl group having 1 to 6 carbon atoms.) (hereinafter, referred to as a sulfonyl imide anion (1)), a lithium cation; a compound represented by the following general formula (2A) (hereinafter, referred to as a compound (2A)); and/or an acid anhydride having an aromatic ring and at least one structure represented by —C(=O)—O—C(=O)— in a molecule (hereinafter, sometimes referred to as an acid anhydride (2B)), wherein the concentration of the anion represented by the general formula (1) is 0.1 mol/L or more.

[Chem. 7]

(2A)

(In the general formula (2A), $R^{13}$ and $R^{14}$ are the same or different and represent an organic group having 1 to 10 carbon atoms which may have a substituent, and $R^{13}$ and $R^{14}$ may be bonded to each other to form a ring, and Z represents O or NH.)

The present inventors have found that when the non-aqueous electrolyte having the above-mentioned constitution of the present invention is used, decomposition of the electrolytic solution, and elution of a transition metal in the positive electrode active material hardly occur even when the battery is operated under high voltage conditions of higher than 4.2 V after storing a battery in a temperature environment of 60° C. or higher, and consequently a lithium ion secondary battery in which reductions in capacity and rate characteristics are suppressed is attained; and when the non-aqueous electrolyte contains the above-mentioned acid anhydride (2B), in addition to the above effect, decomposition of the electrolytic solution, and elution of a transition metal in the positive electrode active material hardly occur even during a cycle of charge and discharge at a charge voltage of higher than 4.2 V under temperature conditions of 45° C. or higher, and cycle performance is improved. These findings have led to completion of the present invention.

The present inventors consider as follows about the reason why the capacity and rate characteristics of the lithium ion secondary battery are improved when the non-aqueous electrolytic solution contains the sulfonyl imide anion (1), the lithium cation, the compound represented by the above general formula (2A) and/or the acid anhydride (2B), wherein the concentration of the anion represented by the general formula (1) is 0.1 mol/L or more.

When the non-aqueous electrolytic solution contains the sulfonyl imide anion (1), if the battery is operated under high voltage conditions of higher than 4.2 V after being stored at high temperature, the rate characteristics are sometimes deteriorated. The reason for this is supposed that an activity of the positive electrode is enhanced by the sulfonyl imide anion (1), and consequently an electrolytic solution material is decomposed at the positive electrode and a decomposition product is deposited on a separator or the negative electrode opposed to the positive electrode. However, by adding the compound (2A) and/or the acid anhydride (2B) to the non-aqueous electrolytic solution containing the sulfonyl imide anion (1), a reduction in rate characteristics is suppressed. The reason for this is supposed that when the compound (2A) and the acid anhydride (2B) are present in the non-aqueous electrolytic solution, decomposition of the electrolytic solution material hardly occurs, and deposition of the decomposition product on the separator or the negative electrode is suppressed.

Further, the sulfonyl imide anion (1) has the effect of suppressing the elution of a transition metal in the positive electrode active material, and in addition to this, a compound containing the sulfonyl imide anion (1) exhibits relatively high ion conductivity. Accordingly, it is supposed that since the sulfonyl imide anion (1), the compound (2A) and/or the acid anhydride (2B) are present in the non-aqueous electrolytic solution, the effects thereof act synergistically, and consequently degradation of a battery is suppressed to enable to maintain high battery characteristics even when used under relatively high voltage conditions after being stored under high temperature conditions. Hereinafter, the non-aqueous electrolytic solution of the present invention will be described.

1-1. Sulfonyl Imide Anion (1)

The sulfonyl imide anion (1) according to the present invention is represented by the general formula (1): $[N(XSO_2)(FSO_2)]^-$. In the general formula (1), X represents a fluorine atom, an alkyl group having 1 to 6 carbon atoms or a fluoroalkyl group having 1 to 6 carbon atoms. The alkyl group having 1 to 6 carbon atoms is preferably a chain or branched chain alkyl group, and more preferably a chain alkyl group. Examples of the alkyl group having 1 to 6 carbon atoms include a methyl group, an ethyl group, a propyl group, an isopropyl group, a butyl group, a pentyl group and a hexyl group. Examples of the fluoroalkyl group having 1 to 6 carbon atoms include groups obtained by substituting a part or all of hydrogen atoms in the alkyl group having 1 to 6 carbon atoms with fluorine atoms. Specific examples thereof include a fluoromethyl group, a difluoromethyl group, a trifluoromethyl group, a fluoroethyl group, a difluoroethyl group, a trifluoroethyl group, a pentafluoroethyl group and the like. As the above-mentioned X, among these, the fluorine atom, the trifluoromethyl group, and the pentafluoroethyl group are preferred.

Specific examples of the sulfonyl imide anion (1) include bis(fluorosulfonyl)imide anion, (fluorosulfonyl)(methylsulfonyl)imide anion, (fluorosulfonyl)(ethylsulfonyl)imide anion, (fluorosulfonyl)(trifluoromethylsulfonyl)imide anion, and (fluorosulfonyl)(pentafluoroethylsulfonyl)imide anion. The sulfonyl imide anion (1) is preferably bis(fluorosulfonyl)imide anion, (fluorosulfonyl)(trifluoromethylsulfonyl)imide anion and (fluorosulfonyl)(pentafluoroethylsulfonyl)imide anion, and more preferably bis(fluorosulfonyl)imide anion and (fluorosulfonyl)(trifluoromethylsulfonyl)imide anion.

The non-aqueous electrolytic solution of the present invention may contain one type of sulfonyl imide anion (1) singly, or may contain two or more kinds of sulfonyl imide anions (1)

In the non-aqueous electrolytic solution of the present invention, while the sulfonyl imide anions (1) are present dissociated from the cations, the sulfonyl imide anions (1) are present in a state of salt in which the anion is ionically bonded with the cation before being dispersed or dissolved in the non-aqueous electrolyte. The cation which forms a salt with the sulfonyl imide anion (1) according to the present invention is not particularly limited and may be any of an inorganic cation and an organic cation. The sulfonyl imide compound containing the sulfonyl imide anion (1) can function as an electrolyte salt and can also function as an additive for improving battery performance in the non-aqueous electrolyte of the present invention. That is, when the sulfonyl imide compound containing the sulfonyl imide anion (1) is, for example, a lithium salt, the sulfonyl imide compound can function as an electrolyte salt of an electrolytic solution for a lithium battery.

Examples of the inorganic cation include monovalent inorganic cations such as $Li^+$, $Na^+$, $K^+$, $Cs^+$, and $Pb^+$; divalent inorganic cations such as $Mg^{2+}$, $Ca^{2+}$, $Zn^{2+}$, $Pd^{2+}$, $Sn^{2+}$, $Hg^{2+}$, $Rh^{2+}$, $Cu^{2+}$, $Be^{2+}$, $Sr^{2+}$, and $Ba^{2+}$; and trivalent inorganic cation such as $Ga^{3+}$. Among them, preferred are an alkali metal cation and an alkaline-earth metal cation, $Li^+$, $Na^+$, $Mg^{2+}$, and $Ca^{2+}$ are preferred since they have small ion radius and are easily used for an electrical storage device or the like, and particularly preferred is $Li^+$.

As the organic cation, an onium cation represented by general formula (3): $L^+$—$R_S$ (wherein, L represents C, Si, N, P, S or O; R are organic groups which are the same or different and may be bonded to one another; s represents the number of R bonded to L and is 3 or 4; and additionally, s is a value determined based on the valency of the element L and the number of double bonds directly bonded to L) is preferable.

The above-mentioned "organic group" represented by R means a hydrogen atom, a fluorine atom or a group containing at least one carbon atom. The above-mentioned "a group containing at least one carbon atom" may be any group as long as the group contains at least one carbon atom and may have other atoms such as a halogen atom and a hetero-atom and also a substituent group. Examples of the substituent group include an amino group, an imino group, an amido group, a group having an ether bond, a group having a thio-ether bond, an ester group, a hydroxyl group, an alkoxy group, a carboxyl group, a carbamoyl group, a cyano group, a disulfide group, a nitro group, a nitroso group, a sulfonyl group, and the like.

Examples of the onium cations represented by the above-mentioned general formula (3) may be those represented by the following general formulas:

[Chem. 8]

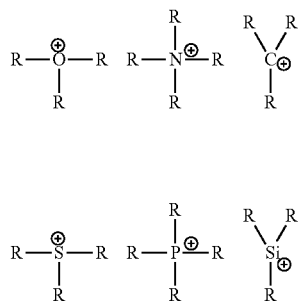

(wherein R represents the same as in the general formula (3))

Among the above mentioned six onium cations, preferred examples of the onium cation includes one containing N, P, S or O for L, more preferably one containing N for L. The onium cations may be used alone, or two or more may be used in combination. Specifically, as the onium cations containing N for L, preferable examples among them are onium cations represented by the following general formulas (4) to (6).

Examples may be at least one kind cation among 10 types of heterocyclic onium cations represented by the following general formulas (4);

[Chem. 9]

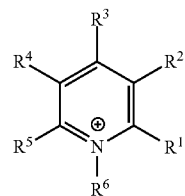
(4-1)

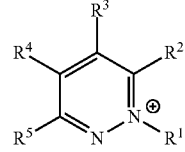
(4-2)

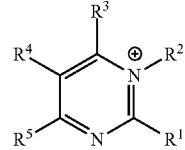
(4-3)

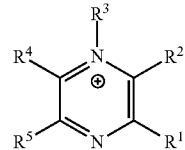
(4-4)

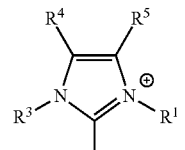
(4-5)

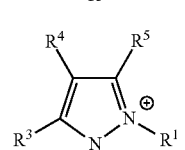
(4-6)

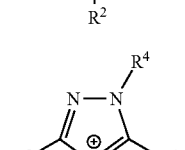
(4-7)

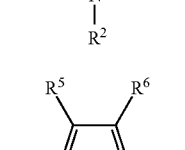
(4-8)

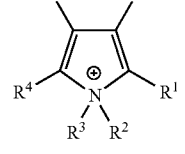
(4-9)

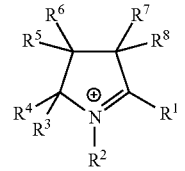

(4-10)

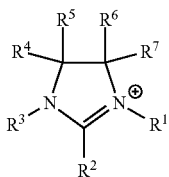

The organic groups $R^1$ to $R^8$ are same as the organic group R exemplified in the general formula (3). More particularly, $R^1$ to $R^8$ represent a hydrogen atom, a fluorine atom, or an organic group; and the organic group is preferably a linear, branched or cyclic hydrocarbon group having 1 to 18 carbon atoms or a fluorocarbon group having 1 to 18 carbon atoms (excluding a group which forms a ring by bonding groups represented by $R^1$ to $R^8$); more preferably a hydrocarbon group having 1 to 8 carbon atoms or a fluorocarbon group having 1 to 8 carbon atoms. Further, the organic group may contain a substituent group as exemplified in the above-mentioned general formula (3), a hetero atom such as N, O or S, or a halogen atom.

Examples may be at least one kind cation among 3 types of saturated cyclic onium cations represented by the following general formulas (5);

[Chem. 10]

(5-1)
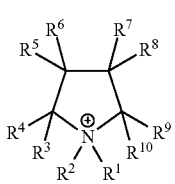

(5-2)
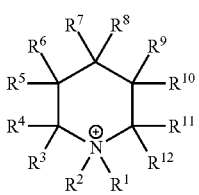

(5-3)
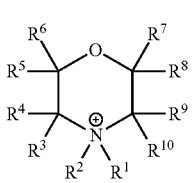

(wherein $R^1$ to $R^{12}$ represent the same as $R^1$ to $R^8$ in the general formula (4))

Examples may be a chain onium cation represented by the following general formulas (6):

[Chem. 11]

(6)
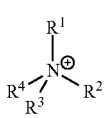

(wherein $R^1$ to $R^4$ are the same as $R^1$ to $R^8$ in the general formula (4))

Examples of the chain onium cations represented by the general formula (6) includes quaternary ammoniums such as tetramethylammonium, tetraethylammonium, tetrapropylammonium, tetrabutylammonium, tetraheptylammonium, tetrahexylammonium, tetraoctylammonium, triethylmethylammonium, methoxyethyldiethylmethylammonium, trimethylphenylammonium, benzyltrimethylammonium, benzyltriethylammonium, benzyltributylammonium, dimethyldistearylammonium, diallyldimethylammonium, 2-methoxyethoxymethyltrimethylammonium, tetrakis(pentafluoroethyl)ammonium, N-methoxytrimethylammonium, N-ethoxytrimethylammonium, and N-propoxytrimethylammonium; tertiary ammoniums such as trimethylammonium, triethylammonium, tributhylammonium, diethylmethylammonium, dimethylethylammonium, and dibutylmethylammonium; secondary ammoniums such as dimethylammonium, diethylammonium, and dibutylammonium; primary ammoniums such as methylammonium, ethylammonium, butylammonium, hexylammonium, and octylammonium; and an ammonium ion such as $NH_4$.

Among the onium cations of the above-mentioned general formula (4) to (6), at least one kind among 6 kinds of onium cations defined by the following general formulas is particularly preferable:

[Chem. 12]

(6)

(4-5)
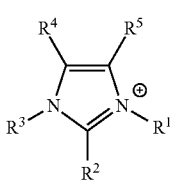

(4-10)
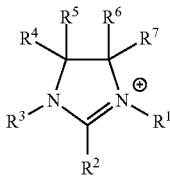

(5-1)
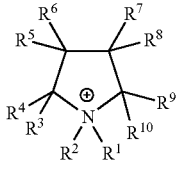

(5-2)
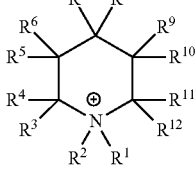

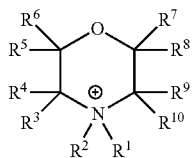

(5-3)

(wherein $R^1$ to $R^{12}$ are the same as $R^1$ to $R^8$ in the general formula (4)).

Particularly preferable examples among the above exemplified 6 kinds of the onium cations are chain quaternary ammoniums such as tetraethylammonium, tetrabutylammonium, and triethylmethylammonium; chain tertiary ammonium such as triethylammonium, tributhylammonium, dibutylmethylammonium, and dimethylethylammonium; imidazoliums such as 1-ethyl-3-methylimidazolium and 1,2,3-trimethylimidazolium; and pyrrolidiniums such as N,N-dimethylpyrrolidinium and N-ethyl-N-methylpyrrolidinium since they are easily made available. From the viewpoint of reduction resistance, quaternary ammonium such as tetraethylammonium, tetrabutylammonium, and triethylmethylammonium, which is classified into the chain onium cation, is furthermore preferable.

The sulfonyl imide compound which is dissociated to produce the sulfonyl imide anions (1) in the non-aqueous electrolytic solution (the compound having a sulfonyl imide anion (1)) may be a combination of the sulfonyl imide anion (1) and the cation respectively described above, and examples thereof include lithium bis(fluorosulfonyl)imide, lithium (fluorosulfonyl) (trifluoromethylsulfonyl)imide, lithium (fluorosulfonyl) (methylsulfonyl)imide, lithium (fluorosulfonyl) (pentafluoroethylsulfonyl)imide, lithium (fluorosulfonyl) (ethylsulfonyl)imide and the like.

The sulfonyl imide compounds may be used singly, or may be used in combination of two or more thereof. As the sulfonyl imide compound, a commercially available product may be used, or a product synthesized by a publicly known method may be used.

The concentration of the sulfonyl imide anion (1) (sulfonyl imide compound) in the non-aqueous electrolytic solution is 0.1 mol/L or more. The concentration is preferably 0.2 mol/L or more, more preferably 0.3 mol/L or more, and moreover preferably 0.4 mol/L or more, and the concentration is preferably 1.5 mol/L or less, more preferably 1.0 mol/L or less, and moreover preferably 0.8 mol/L or less. When the concentration of the sulfonyl imide anion (1) in the non-aqueous electrolytic solution is too high, viscosity of the non-aqueous electrolytic solution is increased, and there is a possibility that ion conductivity is decreased, and there is a possibility that the positive electrode current collector is corroded resulting from the sulfonyl imide anion (1). On the other hand, when the concentration of the sulfonyl imide anion (1) is too low, the effect of suppressing elution of the positive electrode material and the effect of improving ion conductivity may be hardly achieved.

1-2. Electrolyte Salt

The non-aqueous electrolytic solution of the present invention may contain an electrolyte salt different from the sulfonyl imide compound. As the electrolyte salt, publicly known electrolyte salts can be used, such as inorganic or organic cationic salts whose anion are trifluoromethanesulfonate ion ($CF_3SO_3^-$), fluorophosphate ion ($PF_6^-$), perchlorate ion ($ClO_4^-$), tetrafluoroborate ion ($BF_4^-$), hexafluoroarsenate ion ($AsFE^-$), tetracyanoborate ion ($[B(CN)_4]^-$), tetra chloroaluminum ion ($AlCl_4^-$), tricyanomethide ion ($C[(CN)_3]^-$), dicyanamide ion ($N[(CN)_2]^-$), tris(trifluoromethanesulfonyl) methide ion ($C[(CF_3SO_2)_3]^-$), hexafluoroantimonate ion ($SbF_6^-$) and dicyanotriazorate ion (DCTA). In addition, examples of inorganic cations and organic cations include the same ones as those exemplified as pair cations of the sulfonyl imide anions (1).

Among the electrolyte salts, is preferably used one or more lithium salts selected from the group consisting of the compounds (fluorophosphate) represented by the general formula (7): $LiPF_1(C_mF_{2m+1})_{6-1}$ ($0 \leq 1 \leq 6$, $1 \leq m \leq 4$), the compounds (fluoroborate) represented by the general formula (8): $LiBF_n$ ($C_oF_{2o+1})_{4-n}$ ($0 \leq n \leq 4$, $1 \leq o \leq 4$) and lithium hexafluoroarsenate ($LiAsF_6$). By using these lithium salts in combination, corrosion of the positive electrode current collector resulting from the sulfonyl imide anion (1) is inhibited.

Examples of a preferred compound represented by the general formula (7) (hereinafter, sometimes referred to as a lithium salt (7)) include $LiPF_6$, $LiPF_3(CF_3)_3$, $LiPF_3(C_2F_5)_3$, $LiPF_3(C_3F_7)_3$, $LiPF_3(C_4F_9)_3$ and the like. The compound represented by the general formula (7) is more preferably $LiPF_6$ and $LiPF_3(C_2F_5)_3$, and moreover preferably $LiPF_6$.

Examples of a preferred compound represented by the general formula (8) (hereinafter, sometimes referred to as a lithium salt (8)) include $LiBF_4$, $LiBF(CF_3)_3$, $LiBF(C_2F_5)_3$, $LiBF(C_3F_7)_3$ and the like. The compound represented by the general formula (8) is more preferably $LiBF_4$ and $LiBF(CF_3)_3$, and moreover preferably $LiBF_4$.

As the electrolyte salt, the compounds exemplified above may be used singly, or may be used in combination of two or more thereof. The lithium salt is preferably $LiPF_6$, $LiPF_3(C_2F_5)_3$ and $LiBF(CF_3)_3$, more preferably $LiPF_6$ and $LiPF_3(C_2F_5)_3$, and moreover preferably $LiPF_6$. Particularly, $LiPF_6$ is preferred from the viewpoint of ion conductivity.

When the non-aqueous electrolytic solution of the present invention contains a electrolyte salt (preferably, lithium salts (7) and (8) and/or $LiAsF_6$), the used amount of the electrolyte salt is not particularly limited as long as the total concentration of the lithium cations in the non-aqueous electrolyte of the present invention (sum of the concentration of lithium cations derived from the electrolyte salt and the concentration of lithium cations derived from the sulfonyl imide compound containing lithium cations) is within the range described later (more than 1.1 mol/L, and preferably 2.0 mol/L or less).

However, when the concentration of the electrolyte salt is too high, there is a possibility that ion conductivity is reduced due to an increase in viscosity. On the other hand, when the concentration of the electrolyte salt is too low, there is a possibility that corrosion of the positive electrode current collector resulting from the sulfonyl imide compound occurs. Accordingly, the electrolyte salt is preferably used to such an extent that a ratio between the sulfonyl imide compound and the electrolytic salt is 1:100 to 5:1 (sulfonyl imide compound:electrolyte salt, mole ratio). The ratio is more preferably 1:10 to 3:1, and moreover preferably 1:2 to 2:1.

1-3. Lithium Cation

The non-aqueous electrolytic solution of the present invention includes lithium cations. The lithium cation may be derived from the sulfonyl imide compound, or may be derived from the above-mentioned electrolyte salt. The concentration of the lithium cation contained in the non-aqueous electrolytic solution of the present invention is preferably more than 1.1 mol/L. The concentration of the lithium cation in the non-aqueous electrolytic solution of the present invention is more preferably 1.11 mol/L or more, moreover preferably 1.2 mol/L or more, and furthermore preferably 1.25 mol/L or more. When the concentration of the lithium cation is too high, viscosity of the electrolytic solution is increased, and there is a possibility that ion conductivity is decreased, and therefore the lithium cation is preferably used in a concentration of a saturating concentration or less. The concentration of the lithium cation is more preferably 2.0 mol/L or less, and moreover preferably 1.5 mol/L or less.

Herein, "the concentration of the lithium cation in the non-aqueous electrolyte" is a value based on an amount of total lithium cations contained in the non-aqueous electrolyte of the present invention. For example, when two or more kinds of electrolyte salts having lithium cation (preferably, lithium salts (7), (8) and/or LiAsF$_6$) are used, a value determined based on a total amount of lithium cations produced from the used electrolyte salt is taken as a concentration of the lithium cations in the non-aqueous electrolytic solution. Further, when lithium cations are contained in the sulfonyl imide compound, a value determined based on a total amount of lithium cations contained in the sulfonyl imide compound and lithium cations contained in the electrolyte salt used in combination with the sulfonyl imide compound is taken as a concentration of the lithium cations in the non-aqueous electrolytic solution. When the lithium cations are not contained in the sulfonyl imide compound, a total concentration of the electrolyte salt used in combination with the sulfonyl imide compound may be taken as the above-mentioned concentration of the lithium cations.

1-4. Compound (2A), Acid Anhydride (2B)

1-4-1. Compound (2A)

The non-aqueous electrolytic solution of the present invention contains a compound represented by the general formula (2A).

[Chem. 13]

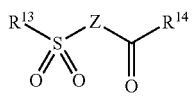

(2A)

In the general formula (2A), $R^{13}$ and $R^{14}$ are the same or different and represent an organic group having 1 to 10 carbon atoms which may have a substituent, and $R^{13}$ and $R^{14}$ may be bonded to each other to forma ring. The organic group may have a hetero atom such as N, O and S, and one or more carbon atoms in a main chain of the organic group may be substituted with the hetero atom. In addition, there may be cases where a substituent has a carbon atom, but the number of carbon atoms of the substituent is not included in the number of carbon atoms of the organic group.

Examples of the organic groups include an alkyl group having 1 to 10 carbon atoms such as a methyl group, an ethyl group, a propyl group, an isopropyl group, a butyl group, an isobutyl group, a pentyl group, an isopentyl group, a hexyl group or the like, or a fluoroalkyl group having 1 to 10 carbon atoms in which a part or all of hydrogen atoms coupled with carbon atoms constituting the alkyl group are substituted with fluorine atoms; an alkenyl group having 2 to 10 carbon atoms such as a vinyl group, an allyl group, a butenyl group, a pentenyl group, a hexenyl group, a heptenyl group, an octenyl group, a nonenyl group, a decenyl group or the like; an alkynyl group having 2 to 10 carbon atoms such as an ethynyl group, a 2-propynyl group, a butynyl group, a pentynyl group, a hexynyl group, a heptynyl group, an octynyl group, a nonynyl group, a decynyl group or the like; and an aryl group such as a phenyl group, a benzyl group, a tolyl group, an o-xylyl group, am-xylyl group, a p-xylyl group or the like.

Examples of the substituent with which the organic groups $R^{13}$ and $R^{14}$ are substituted include halogen atoms (F, Cl, Br and I), an alkyl group having 1 to 5 carbon atoms, a fluoroalkyl group having 1 to 5 carbon atoms, an alkenyl group having 2 to carbon atoms, an alkoxy group having 1 to 5 carbon atoms, an fluoroalkoxy group having 1 to 5 carbon atoms and a cyano group. A specific alkyl group, fluoroalkyl group, alkenyl group and aryl group are the same as organic groups exemplified as the above-mentioned $R^{13}$ and $R^{14}$.

In the general formula (2A), Z represents O or NH. Z is preferably O.

As the compound (2A), dehydrocondensation products can be used which are obtained, for example, by a dehydrocondensation reaction between a sulfonic acid group and a carboxyl group, a sulfonic acid group and a carbamoyl group, or a sulfamoyl group and a carboxyl group. The dehydrocondensation product may be an intramolecular dehydrocondensation product (so-called cyclic anhydride or cyclic sulfonimide compound) of a compound having a sulfonic acid group and a carboxyl group or a carbamoyl group in a molecule, or a compound having a sulfamoyl group and a carboxyl group in a molecule, or may be an intermolecular dehydrocondensation product (e.g., chain anhydride or chain sulfonyl imide compound) in two molecules between a compound having a sulfonic acid group or a sulfamoyl group and a compound having a carboxyl group or between compounds having a sulfonic acid group and a carbamoyl group.

As the compound (2A), a compound having a chain structure or a cyclic structure represented by the following general formulas (2A-1) to (2A-5) is preferably used. In addition, "the compound having a cyclic structure" means a compound in which a structure "—(SO$_2$)—Z—C(O)—" forms a part of a ring, and "the chain compound" means a compound not having a ring structure or a compound in which the "—(SO$_2$)—Z—C(O)—" structure contained in the general formula (2A) is not included in the ring structure although having the ring structure (Z is similar to the general formula (2A)).

[Chem. 14]

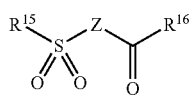

(2A-1)

In the general formula (2A-1), Z is similar to the general formula (2A) (hereinafter, in the general formulas (2A-2) to (2A-5), Z is similar to the general formula (2A)), and $R^{15}$ and $R^{16}$ are the same or different and represent a monovalent organic group having 1 to 10 carbon atoms. Examples of the organic group include an alkyl group having 1 to 10 carbon atoms, a fluoroalkyl group having 1 to 10 carbon atoms, an alkenyl group having 2 to 10 carbon atoms, an alkynyl group having 2 to 10 carbon atoms and an aryl group which are the same as ones exemplified as $R^{13}$ and $R^{14}$. As $R^{15}$ and $R^{16}$, an alkyl group having 1 to 3 carbon atoms, a fluoroalkyl group having 1 to 3 carbon atoms, an alkenyl group having 2 to 3 carbon atoms, an alkynyl group having 2 to 3 carbon atoms and a phenyl group are preferred. Examples of the substituent with which the organic groups $R^{15}$ and $R^{16}$ are substituted include a halogen atom, an alkyl group having 1 to carbon atoms, a fluoroalkyl group having 1 to 5 carbon atoms, an alkenyl group having 2 to 5 carbon atoms and a cyano group.

[Chem. 15]

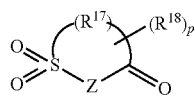

(2A-2)

In the general formula (2A-2), $R^{17}$ represents a divalent hydrocarbon group or fluorohydrocarbon group having 3 to 10 carbon atoms. Examples of the divalent hydrocarbon group include an alkylene group having 3 to 10 carbon atoms such as a trimethylene group, a n-butylene group, a n-pentylene group, a n-hexylene group, a n-heptylene group, a n-octylene group or the like; and an alkenylene group having 3 to 10 carbon atoms such as a propenylene group, a butenylene group, a pentenylene group or the like, and a trimethylene group is preferred. Examples of the fluorohydrocarbon group having 3 to 10 carbon atoms include a 2-fluorotrimethylene group, a 2,3-difluorotrimethylene group, a 2-fluorobutylene group or the like, and a 2-fluorotrimethylene group and a 2,3-difluorotrimethylene group are preferred. $R^{18}$ represents a halogen atom or an organic group having 1 to 5 carbon atoms. Examples of the halogen atom include a fluorine atom, a chlorine atom, a bromine atom, and an iodine atom, and a fluorine atom and a chlorine atom are preferred. Examples of the organic group represented by $R^{18}$ include an alkyl group having 1 to 5 carbon atoms, a fluoroalkyl group having 1 to 5 carbon atoms, an alkenyl group having 2 to 5 carbon atoms and a cyano group which are the same as ones exemplified as the substituent of $R^{13}$ and $R^{14}$. As the substituent, a fluorine atom, a methyl group and an ethyl group are preferred. p represents an integer of 0 to 3. p is preferably 0 or 1.

[Chem. 16]

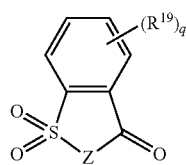

(2A-3)

In the general formula (2A-3), $R^{19}$ represents a halogen atom or an organic group having 1 to 5 carbon atoms. Examples of the halogen atom include a fluorine atom, a chlorine atom, a bromine atom, and an iodine atom, and a fluorine atom and a chlorine atom are preferred. Examples of the organic group represented by $R^{19}$ include an alkyl group having 1 to 5 carbon atoms, a fluoroalkyl group having 1 to 5 carbon atoms, an alkenyl group having 2 to 5 carbon atoms, a cyano group, an alkoxy group having 1 to 5 carbon atoms and a fluoroalkoxy group having 1 to 5 carbon atoms which are the same as ones exemplified as the substituent of $R^{13}$ and $R^{14}$. A fluorine atom, a methyl group and an ethyl group are preferred. q represents an integer of 0 to 4. q is preferably 0 or 1.

[Chem. 17]

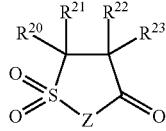

(2A-4)

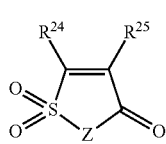

(2A-5)

In the general formulas (2A-4) and (2A-5), $R^{20}$ to $R^{25}$ are the same or different and represent a hydrogen atom, a halogen atom, or an organic group having 1 to 5 carbon atoms. Examples of the halogen atom include a fluorine atom, a chlorine atom, a bromine atom, and an iodine atom, and a fluorine atom and a chlorine atom are preferred. Examples of the organic group having 1 to 5 carbon atoms include an alkyl group having 1 to carbon atoms, a fluoroalkyl group having 1 to 5 carbon atoms, an alkenyl group having 2 to 5 carbon atoms and a cyano group which are the same as ones exemplified as the substituent of $R^{13}$ and $R^{14}$. As the $R^{20}$ to $R^{25}$, a hydrogen atom, a fluorine atom, a methyl group and an ethyl group are preferred.

More specific examples of a compound represented by the general formula (2A-1) include acetic methanesulfonic anhydride, trifluoroacetic trifluoromethanesulfonic anhydride, trifluoroacetic methanesulfonic anhydride, acetic trifluoromethanesulfonic anhydride, acrylic methanesulfonic anhydride, acrylic trifluoromethanesulfonic anhydride, propiolic methanesulfonic anhydride, propiolic trifluoromethanesulfonic anhydride, acetic ethylenesulfonic anhydride, trifluoroacetic ethylenesulfonic anhydride, benzoic methanesulfonic anhydride, benzoic trifluoromethanesulfonic anhydride, and saturated or unsaturated chain compounds such as compounds represented by the following chemical formulas (2A-1-1) to (2A-1-11).

[Chem. 18]

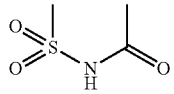

(2A-1-1)

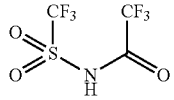

(2A-1-2)

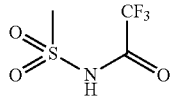

(2A-1-3)

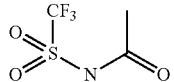

(2A-1-4)

(2A-1-5) 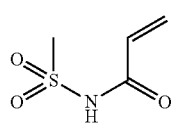
(2A-1-6) 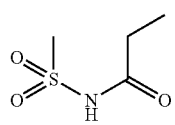
(2A-1-7) 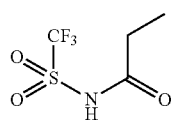
(2A-1-8) 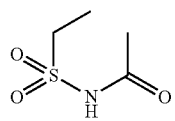
(2A-1-9) 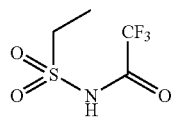
(2A-1-10) 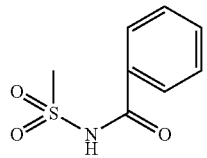
(2A-1-11) 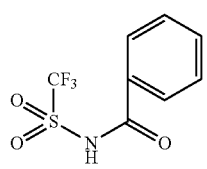
Examples of a compound represented by the general formula (2A-2) include compounds having saturated or unsaturated ring structures represented by the following chemical formulas (2A-2-1) to (2A-2-16).
[Chem. 19]
(2A-2-1) 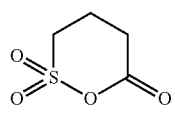
(2A-2-2) 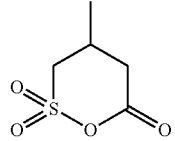
(2A-2-3) 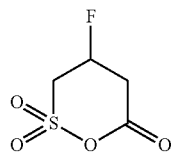
(2A-2-4) 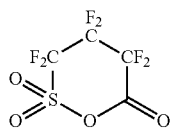
(2A-2-5) 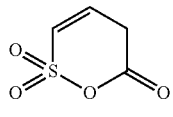
(2A-2-6) 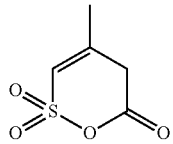
(2A-2-7) 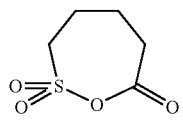
(2A-2-8) 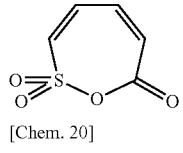
[Chem. 20]
(2A-2-9) 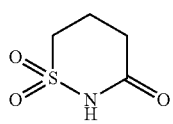
(2A-2-10) 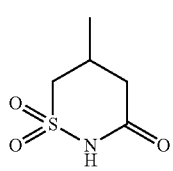
(2A-2-11) 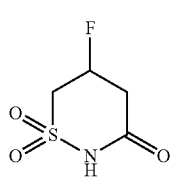
(2A-2-12) 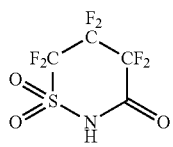
(2A-2-13) 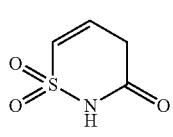
(2A-2-14) 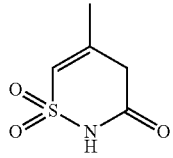

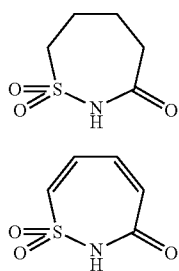
(2A-2-15)

(2A-2-16)

Examples of a compound represented by the general formula (2A-3) includes sulfobenzoic anhydride, fluorosulfobenzoic anhydride, chlorosulfobenzoic anhydride, difluorosulfobenzoic anhydride, dichlorosulfobenzoic anhydride, trifluorosulfobenzoic anhydride, tetrafluorosulfobenzoic anhydride, methylsulfobenzoic anhydride, dimethylsulfobenzoic anhydride, trimethylsulfobenzoic anhydride, ethylsulfobenzoic anhydride, propylsulfobenzoic anhydride, vinylsulfobenzoic anhydride, ethynylsulfobenzoic anhydride, allylsulfobenzoic anhydride, (trifluoromethyl)sulfobenzoic anhydride, di(trifluoro)(methyl)sulfobenzoic anhydride, (trifluoromethoxy)sulfobenzoic anhydride, (fluoro)(methyl)sulfobenzoic anhydride, (chloro)(methyl)sulfobenzoic anhydride, (fluoro)(methoxy)sulfobenzoic anhydride, (chloro)(methoxy)sulfobenzoic anhydride, di(fluoro)(methoxy)sulfobenzoic anhydride, di(trifluoro)(vinyl)sulfobenzoic anhydride, (fluoro)(vinyl)sulfobenzoic anhydride, di(trifluoro) (ethynyl)sulfobenzoic anhydride, (fluoro)(ethynyl)sulfobenzoic anhydride, and compounds represented by the following chemical formulas (2A-3-1) to (2A-3-23).

[Chem. 21]

(2A-3-1)

(2A-3-2)

(2A-3-3)

(2A-3-4)

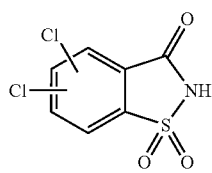

(2A-3-5)

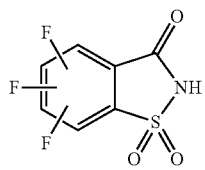

(2A-3-6)

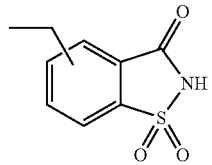

(2A-3-7)

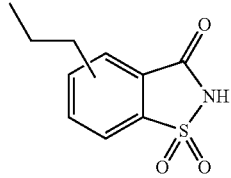

(2A-3-8)

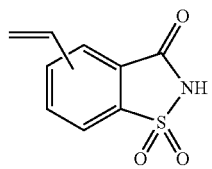

(2A-3-9)

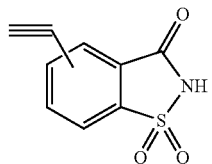

(2A-3-10)

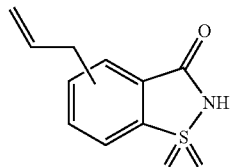

(2A-3-11)

[Chem. 22]

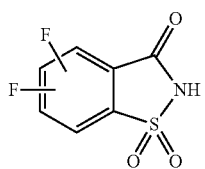

(2A-3-12)

(2A-3-13)
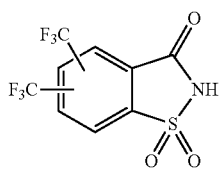
(2A-3-14)
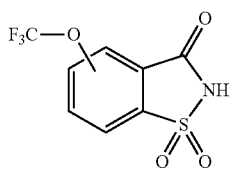
(2A-3-15)
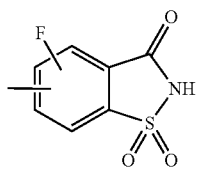
(2A-3-16)
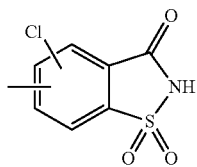
(2A-3-17)
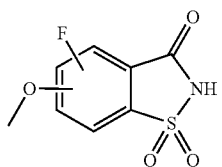
(2A-3-18)
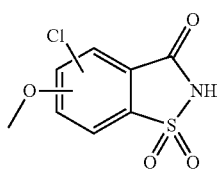
(2A-3-19)
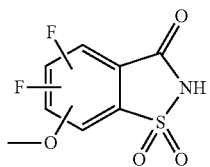
(2A-3-20)
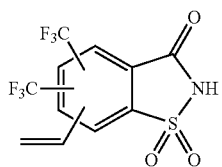
(2A-3-21)
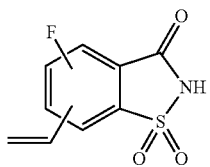
(2A-3-22)
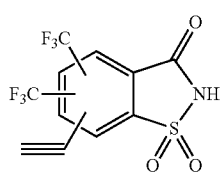
(2A-3-23)
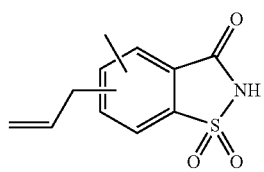
Examples of a compound represented by the general formula (2A-4) include compounds having saturated ring structures represented by the following general formulas (2A-4-1) to (2A-4-12).
[Chem. 23]
(2A-4-1)
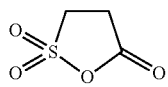
(2A-4-2)
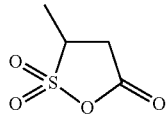
(2A-4-3)
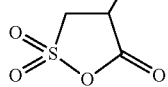
(2A-4-4)
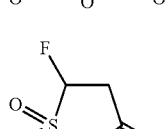
(2A-4-5)
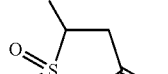
(2A-4-6)
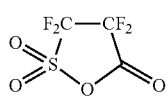
(2A-4-7)
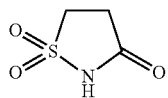
(2A-4-8)
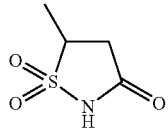

-continued

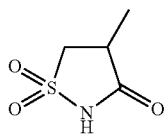
(2A-4-9)

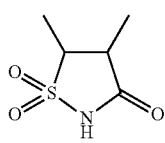
(2A-4-10)

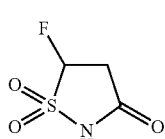
(2A-4-11)

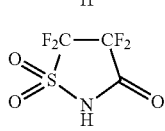
(2A-4-12)

Examples of a compound represented by the general formula (2A-5) includes compounds having unsaturated cyclic structures represented by the following general formulas (2A-5-1) to (2A-5-4).

[Chem. 24]

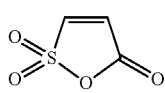
(2A-5-1)

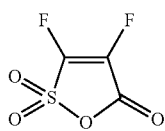
(2A-5-2)

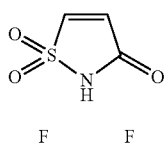
(2A-5-3)

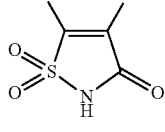
(2A-5-4)

Among the compounds (2A) exemplified above, sulfobenzoic anhydride, fluorosulfobenzoic anhydride, and 2-sulfobenzoic acid imide (Chemical Formula (2A-3-1)) are preferred, and sulfobenzoic anhydride is more preferred. The compounds (2A) may be used singly, or may be used in combination of two or more thereof.

The concentration of the compound (2A) in the non-aqueous electrolytic solution of the present invention is preferably 0.001% by mass or more, more preferably 0.01% by mass or more, moreover preferably 0.1% by mass or more, and furthermore preferably 1% by mass or more, and preferably 5% by mass or less, more preferably 3% by mass or less, and moreover preferably 2% by mass or less. Even when a large amount of the compound (2A) is used, the effect commensurate with the used amount of the compound (2A) is not achieved, and in fact, there may be a possibility that a concentration of the electrolyte salt is reduced, or a possibility that ion conductivity is decreased due to an increase in viscosity. On the other hand, when the concentration of the compound (2A) is too low, there may be a possibility that a desired effect of suppressing a reduction in a battery capacity after storage under high temperature is hardly achieved.

1-4-2. Acid Anhydride (2B)

The non-aqueous electrolytic solution of the present invention contains an acid anhydride having an aromatic ring and at least one structure represented by —C(=O)—O—C(=O)— in a molecule. When such an acid anhydride is contained in the non-aqueous electrolyte, the acid anhydride is decomposed during first charge of a battery to form a film (surface electrolyte interface: SEI) on the positive electrode and the negative electrode, and thereby decomposition of a material of an electrolytic solution is suppressed. Further, deposition of a decomposition product on the negative electrode or the separator is suppressed by this SEI.

The acid anhydride according to the present invention has an aromatic ring. As the aromatic ring, a ring having 6 to 20 carbon atoms is preferred. The number of carbon atoms is more preferably 6 to 12, and moreover preferably 6 to 10. Specific examples of the aromatic ring include a benzene ring, a naphthalene ring, an anthracene ring, a pyrene ring, a perylene ring and the like. A benzene ring and a naphthalene ring are preferred, and a benzene ring is more preferred. Further, the aromatic ring contained in the acid anhydride of the present invention may be one, or the acid anhydride may contain two or more aromatic ring. The acid anhydride having one aromatic ring is preferred.

As the acid anhydride according to the present invention, for example, a dehydrocondensation product which is obtained by a dehydrocondensation reaction between carboxyl groups can be used. The dehydrocondensation product may be an intramolecular dehydrocondensation product (so-called anhydride) of a compound having two or more carboxyl groups in a molecule, or may be an intermolecular dehydrocondensation product between two molecules of compounds having a carboxyl group.

As the acid anhydride according to the present invention, a compound having an acid anhydride ring structure in which "—C (=O)—O—C(=O)—" structure makes up a part of a ring is preferred, and a compound having one or two acid anhydride ring structures in a molecule is preferred. Further, the acid anhydride according to the present invention is more preferably a compound having a structure in which an aromatic ring and an acid anhydride ring are condensed, for example, a dehydrocondensation product of an aromatic polyhydric carboxylic acid.

The aromatic polyhydric carboxylic acid may be a compound having two or more carboxylic acids coupled with an aromatic ring (carboxy groups directly coupled with an aromatic ring), and examples thereof include dehydrocondensation products of an aromatic dicarboxylic acid compound, an aromatic tetracarboxylic acid compound, an aromatic hexacarboxylic acid compound or the like. Preferred one is a compound having one or two acid anhydride ring structures, and a dehydrocondensation product of the aromatic dicarboxylic acid compound or aromatic tetracarboxylic acid compound is preferred, and a dehydrocondensation product (anhydride) of the aromatic dicarboxylic acid compound is more preferred.

Examples of the acid anhydride of the present invention include compounds represented by the following chemical formulas (2B-1) to (2B-12).

[Chem. 25]

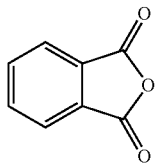
(2B-1)

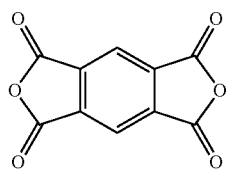
(2B-2)

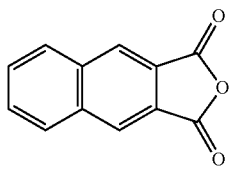
(2B-3)

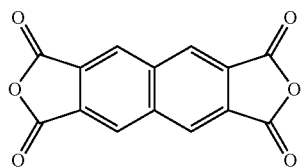
(2B-4)

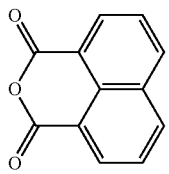
(2B-5)

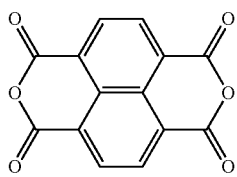
(2B-6)

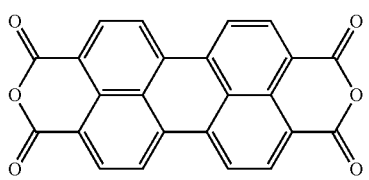
(2B-7)

[Chem. 26]

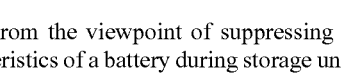
(2B-8)

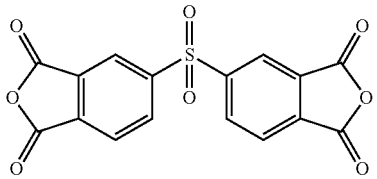
(2B-9)

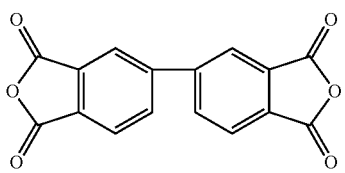
(2B-10)

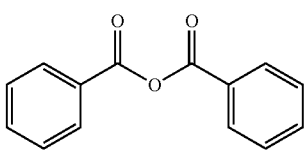
(2B-11)

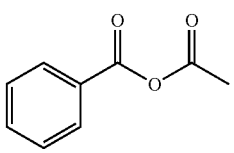
(2B-12)

From the viewpoint of suppressing a reduction in characteristics of a battery during storage under high temperature more effectively, among the acid anhydrides described above, a compound represented by formulas (2B-1) to (2B-10) which is an intramolecular dehydrocondensation product of a compound having two or more carboxyl groups in a molecule is preferred, more preferably a compound having a five membered ring of acid anhydride structure and represented by formulas (2B-1), (2B-2), (2B-3) and (2B-4), and moreover preferably a compound represented by formulas (2B-1) and (2B-2). The acid anhydrides may be used singly, or may be used in combination of two or more thereof.

The concentration of the acid anhydride in the non-aqueous electrolytic solution of the present invention is preferably 0.001% by mass or more, more preferably 0.01% by mass or more, moreover preferably 0.1% by mass or more, and furthermore preferably 0.5% by mass or more, and preferably 5% by mass or less, more preferably 3% by mass or less, and moreover preferably 2% by mass or less with respect to an electrolytic solution mass before adding the acid anhydride (a total of components, such as an electrolyte salt, a solvent and an additive, other than the acid anhydride is set to 100% by mass). Even when a large amount of the acid anhydride is used, the effect commensurate with the used amount of the acid anhydride is not achieved, and in fact, there may be a possibility that a concentration of the electrolyte salt is reduced, or a possibility that ion conductivity is decreased due to an increase in viscosity. On the other hand, when the concentration of the acid anhydride is too low, there may be a possibility that a desired effect of suppressing a reduction in a battery capacity after storage under high temperature is hardly achieved.

In addition, the compound (2A) and the acid anhydride (2B) may be used in combination. Degradation of a battery due to storage at high temperature is also suppressed by the combined use of the compound (2A) and the compound (2B). In this case, the total content of the compound (2A) and the acid anhydride (2B) is preferably set to 5 parts by mass or less with respect to 100 parts by mass of a total of components other than the compounds (2A) and (2B) constituting the non-aqueous electrolytic solution (sulfonyl imide compound (1), other electrolyte salt, a solvent, other components, used as required, other than the compounds (2A) and (2B)). The total content is more preferably 3 parts by mass or less, and moreover preferably 2 parts by mass or less. Further, in this case, a mixing ratio between the compound (2A) and the acid anhydride (2B) is preferably 9:1 to 1:9 (compound (2A):acid anhydride (2B), mass ratio, and so forth), more preferably 9:1 to 4:6, and moreover preferably 9:1 to 6:4.

1-5. Solvent

The non-aqueous electrolytic solution of the present invention may contain a solvent. The solvent capable of being used for the non-aqueous electrolytic solution of the present invention is not particularly limited as long as the electrolyte salt (sulfonyl imide compound and the above-mentioned lithium salt) can be dissolved or dispersed in it, and any of publicly known solvents used for a battery, for example, non-aqueous solvents such as cyclic carbonates described later and a solvent other than the cyclic carbonate; and a medium such as a polymer or a polymer gel which is used in place of the solvent, can be used.

As the non-aqueous solvent, it is preferred that such a solvent exhibits high dielectric constant, can readily dissolve an electrolyte salt, has a boiling point of not less than 60° C., and is electrochemically stable. The non-aqueous solvent is more preferably a non-aqueous organic solvent of which water content is small. Such a non-aqueous organic solvent is exemplified by an ether solvent such as ethylene glycol dimethyl ether, ethylene glycol diethyl ether, tetrahydrofuran, 2-methyltetrahydrofuran, 2,6-dimethyltetrahydrofuran, tetrahydropyran, crown ether, triethylene glycol dimethyl ether, tetraethylene glycol dimethyl ether, 1,4-dioxane and 1,3-dioxolan; a chain carbonate ester solvent such as dimethyl carbonate, ethyl methyl carbonate, diethyl carbonate, diphenyl carbonate and methyl phenyl carbonate; a saturated cyclic carbonate solvent such as ethylene carbonate, propylene carbonate, 2,3-dimethylethylene carbonate (i.e. 2,3-butanediyl carbonate), 1,2-butylene carbonate and erythritan carbonate; a cyclic carbonate solvent having an unsaturated bond, such as vinylene carbonate, methylvinylene carbonate (MVC; i.e., 4-methyl-1,3-dioxole-2-one), ethylvinylene carbonate (EVC; i.e., 4-ethyl-1,3-dioxole-2-one), 2-vinylethylene carbonate (i.e., 4-vinyl-1,3-dioxolane-2-one) and phenylethylene carbonate (i.e., 4-phenyl-1,3-dioxolane-2-one); a fluorine-containing cyclic carbonate solvent such as fluoroethylene carbonate, 4,5-difluoroethylene carbonate and trifluoropropylene carbonate; an aromatic carboxylate ester solvent such as methyl benzoate and ethyl benzoate; a lactone solvent such as γ-butyrolactone, γ-valerolactone and δ-valerolactone; a phosphate ester solvent such as trimethyl phosphate, ethyl dimethyl phosphate, diethyl methyl phosphate and triethyl phosphate; a nitrile solvent such as acetonitrile, propionitrile, methoxypropionitrile, glutaronitrile, adiponitrile, 2-methylglutaronitrile, valeronitrile, butyronitrile and isobutyronitrile; a sulfur compound solvent such as dimethyl sulfone, ethyl methyl sulfone, diethyl sulfone, sulfolane, 3-methylsulfolane and 2,4-dimethylsulfolane; an aromatic nitrile solvent such as benzonitrile and tolunitrile; nitromethane, 1,3-dimethyl-2-imidazolidinone, 1,3-dimethyl-3,4,5,6-tetrahydro-2(1H)-pyrimidinone, 3-methyl-2-oxazolidinone and the like.

Among the exemplified solvents, a carbonate solvent such as a chain carbonate ester solvent, and a cyclic carbonate ester solvent, a lactone solvent and an ether solvent are preferred, dimethyl carbonate, ethyl methyl carbonate, diethyl carbonate, ethylene carbonate, propylene carbonate, γ-butyrolactone and γ-valerolactone are more preferred, a carbonate solvent such as dimethyl carbonate, ethylmethyl carbonate, diethyl carbonate, ethylene carbonate, propylene carbonate is further more preferred. One of the above-described other solvents may be used alone, or two or more other solvents may be used in combination.

When the above-mentioned polymer or polymer gel is used in place of a solvent, the following method may be used. That is, a method in which a solution obtained by dissolving an electrolyte salt in the above-mentioned non-aqueous solvent is added dropwise to a polymer formed into a film by a publicly known method to impregnate the polymer with the electrolyte salt and the non-aqueous solvent or to support the electrolyte salt and the non-aqueous solvent; a method in which a polymer and an electrolyte salt are melted at a temperature of a melting point of the polymer or higher, mixed, and then formed into a film, and the film is impregnated with a non-aqueous solvent (these are gel electrolyte); a method in which a non-aqueous electrolytic solution obtained by dissolving an electrolyte salt in an organic solvent in advance is mixed with a polymer, and the resulting mixture is formed into a film by a casting method or a coating method, and an organic solvent is volatilized; and a method in which a polymer and an electrolyte salt are melted at a temperature of a melting point of the polymer or higher, mixed, and then molded (intrinsic polymer electrolyte) are exemplified.

Examples of a polymer, which issued in place of the medium, include polyether-based polymers such as polyethylene oxide (PEO) and polypropylene oxide which are a homopolymer or a copolymer of epoxy compounds (ethylene oxide, propylene oxide, butylene oxide, allyl glycidyl ether, etc.); methacrylic polymers such as polymethyl methacrylate (PMMA); nitrile-based polymers such as polyacrylonitrile (PAN); fluoropolymers such as polyvinylidene fluoride (PVdF) and polyvinylidene fluoride-hexafluoropropylene; and their copolymers.

In addition, it is recommended to use a cyclic carbonate as a solvent in order to prevent the decomposition of a solvent and from the viewpoint of suppressing deterioration of cycle characteristics (service life) in using the non-aqueous electrolytic solution of the present invention for a lithium ion secondary battery. Examples of the cyclic carbonate include the above-mentioned saturated cyclic carbonate, a cyclic carbonate having an unsaturated bond, a fluorine-containing cyclic carbonate and the like. Among these cyclic carbonates, the saturated cyclic carbonate is preferred in terms of cost, and particularly ethylene carbonate and propylene carbonate are preferred. The cyclic carbonates may be used singly, or may be used in combination of two or more thereof.

The cyclic carbonate is preferably used in such a range that a mole ratio of the cyclic carbonate to the whole lithium cations contained in the non-aqueous electrolyte (cyclic carbonate/$Li^+$) is 1 or more and 5 or less. When the cyclic carbonate is used in the above-mentioned range, deterioration of the cycle characteristics (service life) of a lithium ion secondary battery is more suppressed.

It is known that decomposition of the solvent constituting the non-aqueous electrolytic solution contributes to the deterioration of the cycle characteristics. However, the deterioration of the cycle characteristics can be further suppressed by setting the used amount of the cyclic carbonate to the above-mentioned range with respect to lithium ions. The present inventors think the reason why the deterioration of the cycle characteristics is suppressed as follows. By determining the used amount of the cyclic carbonate in response to the amount of lithium ions, an amount of the cyclic carbonate not solvating with lithium ions present in the non-aqueous electrolytic solution (free cyclic carbonate) can be reduced. That is, it is conceivable that since the amount of free cyclic carbonate capable of being involved in a decomposition reaction is reduced, the decomposition reaction of the solvent hardly occurs to suppress the deterioration of the cycle characteristics.

When the mole ratio (cyclic carbonate/L$^+$) is too large, free cyclic carbonate which is excessively present in the non-aqueous electrolytic solution is oxidatively and/or reductively decomposed, and therefore the cycle characteristics are deteriorated. On the other hand, when the mole ratio is too mall, the amount of the cyclic carbonate is too small, and therefore there may be a possibility that the effect derived from the cyclic carbonate (e.g., effect of forming a film on the negative electrode to suppress decomposition of the non-aqueous electrolyte) is hardly achieved, or there may be a possibility that the non-aqueous electrolytic solution becomes liquid shortage due to consumption (e.g., film formation, decomposition) of a solvent by repeated charge and discharge. Accordingly, the cyclic carbonate is more preferably used in such a range that a mole ratio of the cyclic carbonate to the lithium ion (i.e., cyclic carbonate/Li$^+$) is 1 or more and 4.5 or less, moreover preferably 4.0 or less, furthermore preferably 3 or less, and particularly preferably 2 or less.

The mole ratio of the cyclic carbonate to the lithium cation (i.e., cyclic carbonate/Li$^+$) may be determined by calculation based on a specific gravity and a molar mass of the cyclic carbonate. For example, when the cyclic carbonate is ethylene carbonate, the molar ratio can be calculated in the condition that specific gravity is 1.321 and the molar mass is 88.06.

The non-aqueous electrolytic solution may include a solvent other than the cyclic carbonate (i.e., other solvents) also when the cyclic carbonate issued. Another solvent includes the above-mentioned non-aqueous-based solvents (i.e., other than the cyclic carbonate). Among the non-aqueous-based solvents, chain carbonate esters, aliphatic carboxylic esters, lactones, and ethers are preferred, dimethyl carbonate, ethyl methyl carbonate, diethyl carbonate, γ-butyrolactone and γ-valerolactone and the like are more preferred. The above-mentioned other solvents may be used singly, or may be used in combination of two or more thereof.

In this case, the used amount of the other solvent is preferably 50% by volume or more, more preferably 55% by volume or more, and moreover preferably 60% by volume or more, and preferably 99% by volume or less, more preferably 95% by volume or less, and more over preferably 90% by volume or less with respect to 100% by volume of a total of the cyclic carbonate and the other solvent.

1-6. Other Component

The non-aqueous electrolytic solution of the present invention may contain an additive aimed at improving various characteristics of a lithium ion secondary battery.

Examples of the additive include carboxylic anhydrides such as acetic anhydride, propionicanhydride, butyricanhydride, crotonic anhydride, succinic anhydride, glutaric anhydride, maleic anhydride, citraconic anhydride, glutaconic anhydride, itaconic anhydride, diglycolic anhydride, cyclohexanedicarboxylic anhydride, cyclopentanetetracarboxylic dianhydride, phenylsuccinic anhydride and formic methanesulfonic anhydride; sulfur-containing compounds such as ethylene sulfite, 1,3-propanesultone, 1,4-butanesultone, methyl methanesulfonate, busulfan, sulfolane, sulfolene, dimethyl sulfone, tetramethylthiuram monosulfide and trimethylene glycol sulphate; nitrogen-containing compounds such as 1-methyl-2-pyrrolidinone, 1-methyl-2-piperidone, 3-methyl-2-oxazolidinone, 1,3-dimethyl-2-imidazolidinone, N-methylsuccinimide, N-(methylsulfonyl)formamide represented by the following chemical formula; phosphoric salts such as monofluorophosphate and difluorophosphate; saturated hydrocarbon compounds such as heptane, octane and cycloheptane; and the like.

[Chem. 27]

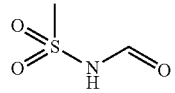

The above-mentioned additive is preferably used in the range of 0.1% by mass or more and 10% by mass or less in 100% by mass of the non-aqueous electrolytic solution of the present invention (more preferably not less than 0.2% by mass and not more than 8% by mass, and moreover preferably not less than 0.3% by mass and not more than 5% by mass). When the used amount of the additive is too small, the effect derived from the additive may be hardly achieved. On the other hand, even when a large amount of additive is used, the effect commensurate with the additive amount of the additive may be hardly achieved, and there may be a possibility that viscosity of the non-aqueous electrolytic solution becomes high and ion conductivity is decreased.

The term 100% by mass of the non-aqueous electrolytic solution means a total of all components contained in the non-aqueous electrolytic solution, such as the sulfonyl imide compound described above, the electrolyte salt, the solvent and the additive appropriately used, and the like.

2. Lithium Ion Secondary Battery

The lithium ion secondary battery of the present invention has a positive electrode containing a positive electrode active material capable of absorbing and releasing lithium ions, a negative electrode containing a negative electrode active material capable of absorbing and releasing lithium ions, and a non-aqueous electrolytic solution. More specifically, a separator is disposed between the positive electrode and the negative electrode, and the non-aqueous electrolytic solution is contained in an outer packaging case with the positive electrode, the negative electrode and other component while the separator is impregnated with the non-aqueous electrolytic solution. The lithium ion secondary battery of the present invention includes the non-aqueous electrolytic solution of the present invention described above.

2-1. Positive Electrode

The positive electrode is prepared by supporting a positive electrode compound composition which contains a positive electrode active material, a conductive auxiliary agent, a binder and the like on a positive electrode current collector. The positive electrode is usually formed into a sheet.

A method for producing a positive electrode is not particularly limited, and examples thereof include (i) a method in which a positive electrode current collector is coated with a positive electrode active material composition prepared by dissolving or dispersing a positive electrode compound composition in a dispersion solvent by a doctor blade method and the like, or a positive electrode current collector is immersed in a positive electrode active material composition, and then dried; (ii) a method in which a positive electrode active material composition is kneaded, formed into a sheet and dried, the sheet is bonded on a positive electrode current collector using an electrically-conductive adhesive, and the obtained bonded body is pressed and dried; (iii) a method in which a positive electrode active material composition containing a liquid lubricant is applied or casted on a positive electrode current collector, the coated current collector is formed into a desired shape, the liquid lubricant is removed, and then the current collector is drawn uniaxially or in multi-axis directions. Further, as required, a dried positive electrode compound composite layer may be pressed. Thereby, adhesive strength of the positive composite layer to the positive electrode current collector is increased, and an electrode density can be enhanced.

A material of the positive electrode current collector, the positive electrode active material, the conductive auxiliary agent, the binder, and a solvent (i.e., solvent in which the positive composite is dispersed or dissolved) used for a positive electrode active material composition are not particularly limited, and publicly known materials can be used. For example, materials described in JP-A-2014-13704 can be used.

The used amount of the positive electrode active material is preferably not less than 75 parts by mass and not more than 98 parts by mass, more preferably 85 parts by mass or more, and moreover preferably 90 parts by mass or more, and more preferably 98 parts by mass or less, and moreover preferably 97 parts by mass or less with respect to 100 parts by mass of the positive electrode compound composition.

When the conductive auxiliary agent is used, the content of the conductive auxiliary agent in the positive electrode compound composition is preferably in the range of 0.1% by mass to 10% by mass (more preferably in the range of 0.5% by mass to 10% by mass, and moreover preferably in the range of 1% by mass to 10% by mass) with respect to 100% by mass of the positive electrode compound composition. When the content of the conductive auxiliary agent is too small, and there may be a possibility that conductivity is extremely deteriorated and a discharge capacity and load characteristics are deteriorated. On the other hand, when the content of the conductive auxiliary agent is too much, it is not preferred since a bulk density of a positive electrode compound composition layer becomes high, and the content of the binder needs to be further increased.

When the binder is used, the content of the binder in the positive electrode compound composition is preferably in the range of 0.1% by mass to 10% by mass (more preferably in the range of 0.5% by mass to 9% by mass, and moreover preferably in the range of 1% by mass to 8% by mass) with respect to 100% by mass of the positive electrode compound composition. When the content of the binder is too small, good adhesiveness may not be achieved, and therefore there may be a possibility that the positive electrode active material and the conductive auxiliary agent are detached from a current collector. On the other hand, when the content of the binder is too much, internal resistance may be increased, and therefore there may be a possibility that battery characteristics are adversely affected.

Compounding amounts of the conductive auxiliary agent and the binder can be appropriately adjusted considering intended use of a battery (focusing on power, focusing on energy), and ion conductivity.

2-2. Negative Electrode

The negative electrode is prepared by supporting a negative electrode compound composition which contains a negative electrode active material, a binder and a conductive auxiliary agent as required on a negative electrode current collector. The negative electrode is usually formed into a sheet.

As a method for producing a negative electrode, the same production method as that of the positive electrode may be employed. Further, a conductive auxiliary agent, a binder and a solvent for dispersing a material to be used during producing the negative electrode are the same as those to be used at the positive electrode.

As a material of the negative electrode current collector and the negative electrode active material, publicly known negative electrode active materials can be used, and for example, materials described in JP-A-2014-13704 can be used.

2-3. Separator

The separator is placed to separate the positive electrode from the negative electrode. The separator is not particularly limited, and any of publicly known separators can be used in the present invention, and for example, the materials of the separator described in JP-A-2014-13704 can be used.

2-4. Battery Exterior Material

A battery element including a positive electrode, a negative electrode, a separator and a non-aqueous electrolytic solution may be contained in a battery exterior material for protecting the battery element from environmental degradation or external impact in using the lithium ion secondary battery. In the present invention, a material of the battery exterior material is not particularly limited, and any of publicly known exterior materials can be used.

A shape of the lithium ion secondary battery according to the present invention is not particularly limited, and any of shapes publicly known as the shapes of a cylindrical, a square-type, a laminate-type, a coin-type and an oversized lithium ion secondary batteries may be used. When the lithium ion secondary battery is used as a high-voltage supply (tens of voltages to hundreds of voltages) for mounting on electric vehicles or hybrid electric vehicles, batteries may also be used in the form of a battery module in which batteries are connected in series.

The rated charge voltage of the lithium ion secondary battery of the present invention is not particularly limited; however, it is preferably higher than 4.2V. The effect according to the present invention becomes remarkable particularly in the case of using at a voltage higher than 4.2 V. The rated charge voltage is more preferably 4.3V or more, and moreover preferably 4.35 V or more. The higher the rated charge voltage is, the higher the energy density can become; however, when it is too high, safety may be sometimes hardly ensured. Therefore, the rated charge voltage is preferably 4.6 V or lower. It is more preferably 4.5 V or lower.

The present application claims the benefit of the priority dates of Japanese patent application No. 2014-062796 filed on Mar. 25, 2014, Japanese patent application No. 2014-185685 filed on Sep. 11, 2014, and Japanese patent application No. 2015-044091 filed on Mar. 5, 2015. All of the contents of the Japanese patent application No. 2014-062796 filed on Mar. 25, 2014, Japanese patent application No. 2014-185685 filed on Sep. 11, 2014, and Japanese patent application No. 2015-044091 filed on Mar. 5, 2015, are incorporated by reference herein.

EXAMPLES

Hereinafter, the present invention is described in detail with Examples. However, the present invention is not limited to the following Examples in any way, and it is possible to carry out the present invention according to the Examples with an additional appropriate change within the range of the above descriptions and the following descriptions. Such a change is also included in the technical scope of the present invention. In the following, unless otherwise mentioned herein, "parts" represents "parts by mass" and "%" represents to "% by mass".

Example A

1. Preparation of Non-Aqueous Electrolytic Solution

Lithium hexafluorophosphate ($LiPF_6$, manufactured by KISHIDA CHEMICAL Co., Ltd., electrolyte salt) was dissolved in anon-aqueous solvent prepared by mixing ethylene carbonate (EC) and ethylmethyl carbonate (EMC) in a volume ratio of 3:7 to prepare a non-aqueous electrolytic solution A-1 in which the concentration of $LiPF_6$ was 1.2 mol/L.

Non-aqueous electrolytic solutions A-2 to A-10 were prepared in the same manner as in the non-aqueous electrolytic solution A-1 except that lithium bis(fluorosulfonyl) imide (hereinafter, sometimes referred to as LiFSI) was used as a compound having a sulfonyl imide anion (1) and producing the sulfonyl imide anion (1) in the non-aqueous electrolytic solution, sulfobenzoic anhydride (manufactured by Tokyo Chemical Industry Co., Ltd.) was used as the compound (2A), and concentrations of lithium hexafluorophosphate, the compound having a sulfonyl imide anion (1) and the compound (2A) in the non-aqueous electrolytic solution were changed to values shown in Table 1.

Non-aqueous electrolytic solutions A-11 to A-14 were prepared in the same manner as in the non-aqueous electrolytic solution A-1 except that a mixing ratio between ethylene carbonate and ethylmethyl carbonate, a kind of the compound (2A), and the concentrations of lithium hexafluorophosphate, the compound having a sulfonyl imide anion (1) and the compound (2A) in the non-aqueous electrolytic solution were changed to values shown in Table 1.

Also, non-aqueous electrolytic solutions A-15 to A-18 were prepared in the same manner as in the non-aqueous electrolytic solution A-1 except that the compound (2A) and the compound (2B) were used, and the concentrations of lithium hexafluorophosphate and the compound having a sulfonyl imide anion (1) in the non-aqueous electrolyte were changed to values shown in Table 2.

In addition, in the non-aqueous electrolytic solutions of Experimental Example A-14 and Experimental Example A-18, 2-sulfobenzoic acid imide (manufactured by Sigma-Aldrich Co., Ltd.) was used as the compound (2A).

2. Preparation of Coin-Cell Type Lithium Ion Secondary Battery 2-1. Preparation of Positive Electrode Sheet A positive electrode compound composition slurry prepared by mixing a positive electrode active material ($LiCoO_2$), a conductive auxiliary agent 1 (acetylene black, AB), a conductive auxiliary agent 2 (graphite) and a binder (polyvinylidene fluoride, PVdF) in a mass ratio of 93:2:2:3 and dispersing the resulting mixture in N-methyl-pyrrolidone was applied onto an aluminum foil (positive electrode current collector), dried and compressed to prepare a positive electrode sheet 1.

2-2. Preparation of Negative Electrode Sheet

An artificial graphite as a negative electrode active material, a conductive auxiliary agent (carbon fiber by a gas phase method, "VGCF (registered trademark)", manufactured by Showa Denko K.K.), and a binder (polyvinylidene fluoride, PVdF) were mixed in a mass ratio of 95.7:0.5:3.8, and the resulting mixture was mixed with N-methyl-2-pyrrolidone to prepare a slurry-like solution. A charge capacity of the positive electrode in charging at a voltage of 4.3 V or 4.4 V was calculated, and the resulting negative electrode compound composition slurry was applied onto a copper foil (negative electrode current collector) so that lithium ion intercalatable capacity of negative electrode/positive charge capacity is 1.15, dried and compressed to prepare two types of negative electrode sheets 1 and 2.

2-3. Assembling of Coin-Cell Type Lithium Ion Secondary Battery

The positive electrode sheet 1 prepared in the above, a negative electrode sheet which was such selected that a rated charge voltage of a coin-cell type lithium ion secondary battery was 4.3 V in combining the negative electrode sheet with the positive electrode sheet, and a separator (16 µm) made of polyethylene were each punched out in a circle shape (positive electrode diameter 12 mm, negative electrode diameter 14 mm, separator diameter 16 mm). A coin-cell type lithium ion secondary battery was prepared using parts for a CR2032 coin type battery purchased from Hohsen Corporation. The parts contained a positive electrode case made of aluminum clad SUS 304L, a negative electrode cap made of SUS 316L, a spacer having a thickness of 1 mm and made of SUS 316L, a wave washer made of SUS 316L, a gasket made of polypropylene. Specifically, the negative electrode cap fitted with the gasket, the wave washer, the spacer, the negative electrode sheet, and the separator were overlaid in this order. The copper foil side of the negative electrode was faced to the spacer. Then, the separator made of polyethylene was impregnated with 70 µL of a non-aqueous electrolytic solution A-1. Next, the positive electrode sheet was disposed so that the surface provided with the positive composite applied thereto was faced to a negative electrode active material layer side, a positive electrode case was overlaid thereon, and the case was swaged by a swaging tool to prepare a coin-cell type lithium ion secondary battery A-1.

Using a charge/discharge tester (ACD-01, manufactured by ASKA ELECTRONIC CO., LTD.), in an environment of 25° C., the coin-cell type lithium ion secondary battery A-1 was charged under predetermined charge conditions of 0.5 C, 4.3 V or 4.4 V, constant current constant voltage mode, and 0.02 C cut, and then was discharged at a discharge rate of 0.2 C until a voltage reached 2.75 V. A discharge capacity at this time was taken as an initial capacity at 0.2 C.

The battery was charged again under the same conditions, and discharged at a discharge rate of 1 C until a voltage reached 2.75 V, and a discharge capacity at 1 C was measured.

Coin-cell type lithium ion secondary batteries A-2 to A-18 were prepared in the same manner as in the above except that the non-aqueous electrolytic solution was changed as shown in Table 1 or 2, and the negative electrode sheet was such changed that a rated charge voltage of the coin-cell type lithium ion battery was 4.3 V or 4.4 V in combining the negative electrode sheet with the positive electrode sheet. Initial capacities at 0.2 C and at 1 C of each battery were measured. Constitutions of the batteries are shown in Table 1 and Table 2. Batteries used in Experimental Examples A-1 to A-18 correspond to coin-cell type lithium ion secondary batteries A-1 to A-18.

3. Battery Evaluation 3-1. Measurement of Recovery Capacity at 0.2 C and Rate Characteristics after being Stored (1 C/0.2 C)

Using a charge/discharge tester (ACD-01, manufactured by ASKA ELECTRONIC CO., LTD.), the coin-cell type lithium ion secondary battery was charged under predetermined charge conditions of 1 C, 4.3V or 4.4V, constant current constant voltage mode, and cut at 3 hours in an environment of 25° C., and then was stored in a thermostat bath set at 80° C. for 3 days.

The coin-cell type lithium ion secondary battery after being stored at 80° C. was left standing in an environment of 25° C. for 24 hours and discharged at a discharge rate of 1 C at 25° C. until a voltage reached 2.75 V, and a discharge capacity was measured (remaining capacity at 1 C).

Then, the battery was charged at 1 C under constant current constant voltage mode of cut at 0.02 C until a voltage reached a rated charge voltage (4.3 V or 4.4 V), and discharged at 0.2 C at a constant current until a voltage reached 2.75 V. A capacity at this time was defined as a recovery capacity at 0.2 C after being left. From values of the initial capacity at 0.2 C and the recovery capacity at 0.2 C after being left, a recovery capacity at 0.2 C (%) was determined using the following formula. The results were shown in Table 1 and Table 2.

Recovery capacity at 0.2 C (%)=(Capacity at 0.2 C after being left/Initial capacity at 0.2 C)×100

Moreover, the battery was charged at 1 C under constant current constant voltage mode of cut at 0.02 C until a voltage reached a rated charge voltage (4.3 V or 4.4 V), and discharged at 1 C at a constant current until a voltage reached 2.75 V. A capacity at this time was defined as a capacity at 1 C after being left. A ratio of the capacity at 1 C after being left to the capacity at 0.2 C after being left was taken as rate characteristic after being stored, and these are shown in Table 1 and Table 2.

Rate characteristic after being stored (%)=(1 C/0.2 C)×100

3-2. Cycle Characteristic Test

Using a charge/discharge tester (ACD-01, manufactured by ASKA ELECTRONIC CO., LTD.), the coin-cell type lithium ion secondary batteries A9 and A11 to A13 were subjected to a cycle characteristic test in an environment of 25° C. under predetermined charge conditions of 1 C, 4.4 V, constant current constant voltage mode and 0.02 C cut, and predetermined discharge conditions of 1 C, constant current discharge mode, and 2.75 V cut providing a rest time of 10 minutes during each charge and discharge. Charge-discharge efficiency was calculated from the following formula. The results are shown in Table 3.

Capacity retention ratio (%)=(1 C capacity of 100th cycle/1 C capacity of 1st cycle)×100

3-3. ICP Emission Spectrometric Analysis of Negative Electrode (Co Detection Amount)

Using an ICP emission spectrometer (manufactured by Shimadzu Corporation), the negative electrode after a high temperature storage test was analyzed. The negative electrode after the high temperature storage test was washed with 50 ml of ethyl methyl carbonate, and dissolved in 1 g of nitric acid, and the resulting solution was diluted 15 times with pure water to prepare a sample for measurement, and ICP emission spectrometric analysis was performed. Indexation of a Co detection amount in each Experimental Example was performed assuming that the Co detection amount of the negative electrode in Experimental Example A-1 is 100. The results are shown in Table 1 and Table 2.

TABLE 1

| Experimental Example | $LiPF_6$ (mol/L) | LiFSI (mol/L) | Compound (2A) Kind | Compound (2A) Content (% by mass) | Solvent composition EC/MEC (vol/vol) | Cyclic carbonate/$Li^+$ | Charge voltage (V) | Recovery capacity at 0.2 C (%) | Rate characteristics after stored 1 C/0.2 C | Co detection amount |
|---|---|---|---|---|---|---|---|---|---|---|
| A-1 | 1.2 | — | — | — | 3/7 | 3.75 | 4.3 | 79.4 | 70.4 | 100.0 |
| A-2 | 1.2 | — | Sulfobenzoic anhydride | 1 | 3/7 | 3.75 | 4.3 | 80.3 | 72.0 | 101.0 |
| A-3 | 1 | 0.2 | Sulfobenzoic anhydride | 1 | 3/7 | 3.75 | 4.3 | 84.4 | 77.2 | 59.5 |
| A-4 | 0.6 | 0.6 | Sulfobenzoic anhydride | 1 | 3/7 | 3.75 | 4.3 | 86.7 | 79.4 | 56.0 |
| A-5 | 0.6 | 0.6 | — | — | 3/7 | 3.75 | 4.3 | 78.9 | 54.2 | 55.5 |
| A-6 | 1.2 | — | — | — | 3/7 | 3.75 | 4.4 | 76.4 | 52.4 | 133.6 |
| A-7 | 1.2 | — | Sulfobenzoic anhydride | 1 | 3/7 | 3.75 | 4.4 | 77.5 | 53.7 | 134.6 |
| A-8 | 1 | 0.2 | Sulfobenzoic anhydride | 1 | 3/7 | 3.75 | 4.4 | 80.3 | 61.7 | 74.0 |
| A-9 | 0.6 | 0.6 | Sulfobenzoic anhydride | 1 | 3/7 | 3.75 | 4.4 | 81.6 | 68.6 | 68.5 |
| A-10 | 0.6 | 0.6 | — | — | 3/7 | 3.75 | 4.4 | 75.7 | 34.8 | 67.5 |
| A-11 | 0.6 | 0.6 | Sulfobenzoic anhydride | 1 | 15/85 | 1.88 | 4.4 | 82.1 | 68.9 | 67.8 |
| A-12 | 0.6 | 0.6 | Sulfobenzoic anhydride | 1 | 2/8 | 2.50 | 4.4 | 81.7 | 69.2 | 68.7 |
| A-13 | 0.6 | 0.6 | Sulfobenzoic anhydride | 1 | 5/5 | 6.25 | 4.4 | 76.7 | 61.2 | 68.4 |
| A-14 | 0.6 | 0.6 | Sulfobenzoic acid imide | 1 | 3/7 | 3.75 | 4.4 | 81.2 | 68.2 | 68.2 |

TABLE 2

| Experimental Example | LiPF$_6$ (mol/L) | LiFSI (mol/L) | Compound (2A) Kind | Content (% by mass) | Compound (2B) Kind | Content (% by mass) | Solvent composition EC/MEC (vol/vol) | Cyclic carbonate/Li$^+$ | Charge Voltage (V) | Recovery capacity at 0.2 C (%) | Rate characteristics after stored 1 C/0.2 C | Co detection amount |
|---|---|---|---|---|---|---|---|---|---|---|---|---|
| A-15 | 0.6 | 0.6 | Sulfobenzoic anhydride | 0.8 | Phthalic anhydride | 0.2 | 3/7 | 3.75 | 4.4 | 81.6 | 68.6 | 68.7 |
| A-16 | 0.6 | 0.6 | Sulfobenzoic anhydride | 0.5 | Phthalic anhydride | 0.5 | 3/7 | 3.75 | 4.4 | 81.5 | 68.5 | 68.8 |
| A-17 | 0.6 | 0.6 | Sulfobenzoic anhydride | 0.5 | Pyromellitic dianhydride | 0.5 | 3/7 | 3.75 | 4.4 | 81.4 | 68.5 | 68.8 |
| A-18 | 0.6 | 0.6 | Sulfobenzoic acid imide | 0.5 | Pyromellitic dianhydride | 0.5 | 3/7 | 3.75 | 4.4 | 81.4 | 68.4 | 68.9 |

TABLE 3

| Experimental Example | Retention capacity |
|---|---|
| A-9 | 83.7 |
| A-11 | 86.2 |
| A-12 | 85.9 |
| A-13 | 54.6 |

From Table 1, the recovery capacity at 0.2 C and the rate characteristics after being stored (1 C/0.2 C) of the batteries of Experimental Examples A-2 and A-7 in which the compound (2A) was used were superior to those of the batteries of Experimental Examples A-1 and A-6 in which the compound (2A) was not used. Further, when the non-aqueous electrolytic solution contains the sulfonyl imide anion (1) in addition to the compound (2A), the non-aqueous electrolytic solution had a higher recovery capacity at 0.2 C and good rate characteristics after being stored (see batteries of Experimental Examples A-3, A-4, A-8 and A-9).

Moreover, it is found that when the non-aqueous electrolytic solution contains the sulfonyl imide anion (1) (i.e., batteries of Experimental Examples A-3 to A-5, A-8 to A-10), a Co detection amount at the negative electrode was significantly reduced compared with the batteries of Experimental Examples A-1, A-2, A-6 and A-7 in which the non-aqueous electrolytic solution does not contain the sulfonyl imide anion (1), and the elution of a transition metal contained in the positive electrode is suppressed. Further, the battery of Experimental Example A-14 in which a kind of the compound (2A) was changed had the same result, and the battery of Experimental Example A-14 had a high recovery capacity at 0.2 C and good rate characteristics after being stored compared with the case in which non-aqueous electrolytic solution does not contain the compound (2A), and the Co detection amount at the negative electrode was reduced.

From these results, it is thought that when the non-aqueous electrolytic solution contains the compound (2A) and the sulfonyl imide anion (1), the effect of suppressing the deterioration of a battery capacity and rate characteristics which is derived from the compound (2A), the effect of suppressing the elution of the positive electrode which is derived from the sulfonyl imide anion (1), and relatively high ion conductivity of the sulfonyl imide compound act synergistically. Consequently, degradation of a battery was suppressed to enable to maintain high battery characteristics even when used under relatively high voltage conditions after being stored under high temperature conditions.

Further, from Table 1 and Table 2, the recovery capacity at 0.2 C and the rate characteristics after being stored (1 C/0.2 C) of the batteries of Experimental Examples A-15 to A-18 in which the compound (2A) and the compound (2B) were used in combination were superior to those of the battery of Experimental Example A-10 in which the compound (2A) was not used, or the battery of Experimental Example A-7 in which the non-aqueous electrolytic solution did not contain the sulfonyl imide anion (1). From these results, it is found that also when the non-aqueous electrolytic solution contains the compound (2B) in addition to the compound (2A) and the sulfonyl imide anion (1), degradation of a battery is suppressed to enable to maintain high battery characteristics even when used under relatively high voltage conditions after being stored under high temperature conditions.

Moreover, from the results of Experimental Example A-9 and Experimental Examples A-11 to A-13, it is found that when the compound (2A) is used, and the mole ratio of the cyclic carbonate to the whole lithium cations contained in the non-aqueous electrolytic solution (i.e., cyclic carbonate/Li$^+$) is not less than 1 and not more than 5, the recovery capacity at 0.2 C and the deterioration of rate characteristics after being stored are more suppressed, and further the deterioration of cycle characteristics can be suppressed (see Table 1 and Table 3).

Example B

1. Preparation of Non-Aqueous Electrolytic Solution

Lithium hexafluorophosphate (LiPF$_6$, manufactured by KISHIDA CHEMICAL Co., Ltd., electrolyte salt) was dissolved in a non-aqueous solvent prepared by mixing ethylene carbonate (EC) and ethylmethyl carbonate (EMC) in a volume ratio of 3:7 to prepare a non-aqueous electrolytic solution B-1 in which the concentration of LiPF$_6$ was 1.2 mol/L.

Non-aqueous electrolytic solutions B-2 to B-9 were prepared in the same manner as in the non-aqueous electrolytic solution B-1 except that lithium bis(fluorosulfonyl) imide (hereinafter, sometimes referred to as LiFSI) or lithium (fluorosulfonyl)(trifluoromethylsulfonyl) imide (hereinafter, sometimes referred to as LiFTI) was used as a compound having a sulfonyl imide anion (1) and producing the sulfonyl imide anion (1) in the non-aqueous electrolytic solution, phthalic anhydride (manufactured by Wako Pure Chemical Industries, Ltd.) or pyromellitic dianhydride (manufactured by Tokyo Chemical Industry Co., Ltd.) was used as an acid anhydride, and concentrations of lithium hexafluorophosphate, the compound having a sulfonyl imide anion (1) and the acid anhydride in the non-aqueous electrolytic solution were changed to values shown in Table 4.

2. Preparation of Laminate Type Lithium Ion Secondary Battery 2-1. Preparation of Positive Electrode Sheet A positive electrode compound composition slurry prepared by mixing a positive electrode active material (LiCoO$_2$), a conductive auxiliary agent 1 (acetylene black, AB), a conductive auxiliary agent 2 (graphite) and a binder (polyvinylidene fluoride, PVdF) in a mass ratio of 93:2:2:3 and dispersing the resulting mixture in N-methyl-pyrrolidone was applied onto an aluminum foil (positive electrode current collector), dried and compressed to prepare a positive electrode sheet 1.

2-2. Preparation of Negative Electrode Sheet

An artificial graphite as a negative electrode active material, a conductive auxiliary agent (carbon fiber by a gas phase method, "VGCF (registered trademark)", manufactured by Showa Denko K.K.), and a binder (polyvinylidene fluoride, PVdF) were mixed in a mass ratio of 95.7:0.5:3.8, and the resulting mixture was mixed with N-methyl-2-pyrrolidone to prepare a slurry-like solution. A charge capacity of the positive electrode in charging at a voltage of 4.3 V or 4.4 V was calculated, and the resulting negative electrode compound composition slurry was applied onto a copper foil (negative electrode current collector) so that lithium ion intercalatable capacity of negative electrode/positive charge capacity is 1.15, dried and compressed to prepare two types of negative electrode sheets 1 and 2.

2-3. Preparation of Laminate Type Lithium Ion Secondary Battery

The positive electrode sheet 1 prepared in the above, and a negative electrode sheet which was such selected that a rated charge voltage of a laminate type lithium ion secondary battery was 4.3 V in combining the negative electrode sheet with the positive electrode sheet were laminated so as to be faced to each other, and a polyethylene separator having the thickness of 16 μm was sandwiched therebetween. A laminate of the positive electrode sheet, the separator and the negative electrode sheet was sandwiched between two aluminum laminate films, and the inside of the aluminum laminate films was filled with the non-aqueous electrolyte B-1 and sealed in a vacuum state.

Laminate type lithium ion secondary batteries B-2 to B-14 were prepared in the same manner as in the above except that the non-aqueous electrolytic solution was changed as shown in Table 4, and the negative electrode sheet was such changed that a rated charge voltage of the laminate type lithium ion battery was 4.3 V or 4.4 V in combining the negative electrode sheet with the positive electrode sheet. Constitutions of the batteries are shown in Table 4. Batteries used in Experimental Examples B-1 to B-14 correspond to laminate type lithium ion secondary batteries B-1 to B-14.

3. Battery Evaluation 3-1. Measurement of Recovery Capacity at 0.2 C and Rate Characteristics after being Stored (1 C/0.2 C)

Using a charge/discharge tester (ACD-01, manufactured by ASKA ELECTRONIC CO., LTD.), in an environment of 25° C., the laminate type lithium ion secondary battery B-1 was charged under predetermined charge conditions of 0.5 C, 4.3V or 4.4 V, constant current constant voltage mode, and 0.02 C cut, and then was discharged at a discharge rate of 0.2 C until a voltage reached 2.75V. A discharge capacity at this time was taken as an initial capacity at 0.2 C.

The battery was charged again under the same conditions, and discharged at a discharge rate of 1 C until a voltage reached 2.75 V, and a discharge capacity at 1 C was measured.

Using a charge/discharge tester (ACD-01, manufactured by ASKA ELECTRONIC CO., LTD.), the laminate type lithium ion secondary battery was charged under predetermined charge conditions of 1 C, 4.3V or 4.4V, constant current constant voltage mode, and cut at 3 hours in an environment of 25° C., and then was stored in a thermostat bath set at 80° C. for 3 days.

The laminate type lithium ion secondary battery after being stored was left standing in an environment of 25° C. for 24 hours and discharged at a discharge rate of 1 C at 25° C. until a voltage reached 2.75V, and a discharge capacity was measured (remaining capacity at 1 C).

Then, the battery was charged at 1 C under constant current constant voltage mode of cut at 0.02 C until a voltage reached a rated charge voltage (4.3 V or 4.4 V), and discharged at 0.2 C at a constant current until a voltage reached 2.75V. A capacity at this time was defined as a recovery capacity at 0.2 C after being left. From values of the initial capacity at 0.2 C and the recovery capacity at 0.2 C after being left, a recovery capacity at 0.2 C (%) was determined using the following formula. The results were shown in Table 4.

Recovery capacity at 0.2 C (%)=(Capacity at 0.2 C after being left/Initial capacity at 0.2 C)×100

Moreover, the battery was charged at 1 C under constant current constant voltage mode of cut at 0.02 C until a voltage reached a rated charge voltage (4.3 V or 4.4 V), and then, discharged at 1 C at a constant current until a voltage reached 2.75 V. A capacity at this time was defined as a capacity at 1 C after being left. A ratio of the capacity at 1 C after being left to the capacity at 0.2 C after being left was taken as rate characteristic after being stored, and these are shown in Table 4.

Rate characteristic (%)=(Capacity at 1 C after being left/Capacity at 0.2 C after being left)×100

3-2. ICP Emission Spectrometric Analysis of Negative Electrode (Co Detection Amount)

Using an ICP emission spectrometer (manufactured by Shimadzu Corporation), the negative electrode after a high temperature storage test was analyzed. The negative electrode after the high temperature storage test was washed with 50 ml of ethylmethyl carbonate, the negative electrode active material was detached from the negative electrode and dissolved in 1 g of nitric acid, and the resulting solution was diluted 15 times with pure water to prepare a sample for measurement, and ICP emission spectrometric analysis was performed. Indexation of a Co detection amount in each Experimental Example was performed assuming that the Co detection amount of the negative electrode in Experimental Example B-3 is 100. The results are shown in Table 4.

3-3. Measurement of Capacity Retention Ratio

Using a charge/discharge tester (ACD-01, manufactured by ASKA ELECTRONIC CO., LTD.), in an environment of temperature of 45° C., a battery was charged at a charge rate of 1 C under the constant current constant voltage mode of 4.3 V or 4.4 V until a current amount reached 0.02 C, then was discharged at a discharge rate of 1 C until a voltage reached 2.75 V, and subjected to a cycle characteristic test providing a pause time of 10 minutes during each charge and discharge. A capacity retention ratio was calculated from the following formula. The results are shown in Table 4.

Capacity retention ratio (%)=(Discharge capacity at 200 cycles/Discharge capacity at 1 cycle)×100

TABLE 4

| Experimental Example | Non-aqueous electrolytic solution | LiPF$_6$ (mol/L) | LiFSI (mol/L) | LiFTI (mol/L) | Compound (2B) (% by mass) | Charge voltage (V) | Recovery capacity at 0.2 C (%) | Rate characteristics after stored (%) | Retention capacity rate after 200 cycles at 45° C. (%) | Co detection amount (%) |
|---|---|---|---|---|---|---|---|---|---|---|
| B-1 | B-1 | 1.2 | — | — | Phthalic anhydride 1 | 4.3 | 80.6 | 72.6 | 75.7 | 99.7 |
| B-2 | B-2 | 0.6 | 0.6 | — | Phthalic anhydride 1 | 4.3 | 86.8 | 80.2 | 82.6 | 55.8 |
| B-3 | B-3 | 1.2 | — | — | — | 4.3 | 79.4 | 70.4 | 75.6 | 100.0 |
| B-4 | B-4 | 0.6 | — | 0.6 | — | 4.3 | 77.6 | 55.1 | 70.1 | 59.2 |
| B-5 | B-5 | 0.6 | — | 0.6 | Phthalic anhydride 1 | 4.3 | 87.1 | 80.6 | 82.2 | 59.1 |
| B-6 | B-1 | 1.2 | — | — | Phthalic anhydride 1 | 4.4 | 77.6 | 54.1 | 74.8 | 131.4 |
| B-7 | B-6 | 1.2 | — | — | Pyromellitic dianhydride 1 | 4.4 | 76.2 | 53.4 | 74.6 | 130.4 |
| B-8 | B-2 | 0.6 | 0.6 | — | Phthalic anhydride 1 | 4.4 | 82.5 | 72.2 | 81.5 | 68.1 |
| B-9 | B-7 | 0.6 | 0.6 | — | Pyromellitic dianhydride 1 | 4.4 | 81.6 | 71.7 | 81.2 | 67.7 |
| B-10 | B-8 | 0.6 | 0.6 | — | — | 4.4 | 75.7 | 34.8 | 61.1 | 67.5 |
| B-11 | B-3 | 1.2 | — | — | — | 4.4 | 76.4 | 52.4 | 74.6 | 133.6 |
| B-12 | B-4 | 0.6 | — | 0.6 | — | 4.4 | 74.7 | 36.2 | 60.4 | 69.4 |
| B-13 | B-5 | 0.6 | — | 0.6 | Phthalic anhydride 1 | 4.4 | 82.0 | 71.4 | 81.2 | 69.2 |
| B-14 | B-9 | 0.6 | — | 0.6 | Pyromellitic dianhydride 1 | 4.4 | 81.6 | 71.2 | 81.0 | 68.6 |

From the comparisons of the batteries B-1, B-3, B-6 and B-11 shown in Table 4, it is found that the battery characteristic is improved a little by addition of the acid anhydride (comparison between the batteries B-1 and B-3 and between the batteries B-6 and B-11), but this improvement effect is deteriorated with an increase of a voltage (comparison between the batteries B-1 and B-6). Further, from the comparison among the batteries B-3, B-4, B-10 to B-12, it is found that the battery characteristic is rather deteriorated when only compound having the sulfonyl imide anion (1) is added (comparison between batteries B-3 and B-4 and between batteries B-11 and B-10 or B-12), and deterioration of the battery characteristic is more accelerated by an increase in voltage (comparison between batteries B-4 and B-12).

On the other hand, when the electrolytic solution contains the sulfonyl imide anion (1) and the acid anhydride (i.e., batteries B-2, B-5, B-8, B-13), these batteries have better battery characteristics than the batteries B-3 and B-11. From these results, it can be verified that when a compound having the sulfonyl imide anion (1) and the acid anhydride are used in combination, there is an synergetic effect that deterioration of battery characteristics can be suppressed and further accelerated deterioration of battery characteristics due to an increase of voltage can also be suppressed, but these cannot be achieved by adding each of the compounds singly. Further, the same effect could also be verified in the case where pyromellitic dianhydride was used as the acid anhydride (batteries B-7, B-9, B-14).

Moreover, when the non-aqueous electrolytic solution contains the sulfonyl imide anion (1) (i.e., batteries B-2, B-5, B-8, B-9, B-13, B-14), the Co detection amount at the negative electrode was significantly reduced compared with the batteries B-1, B-6, B-7 not containing the sulfonyl imide anion (1), and the elution of a transition metal contained in the positive electrode was suppressed.

From these results, it is thought that when the non-aqueous electrolyte contains the sulfonyl imide anion (1) and the acid anhydride, the effect of suppressing the deterioration of a battery capacity and rate characteristics which is derived from the acid anhydride, the effect of suppressing the elution of the positive electrode which is derived from the sulfonyl imide anion (1), and relatively high ion conductivity of the sulfonyl imide compound act synergistically. Consequently, degradation of a battery was suppressed to enable to maintain high battery characteristics even when used under relatively high voltage conditions after being stored under high temperature conditions.

The invention claimed is:

1. A non-aqueous electrolytic solution comprising an anion represented by the following formula (1):

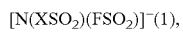

[N(XSO$_2$)(FSO$_2$)]$^-$ (1), wherein X represents a fluorine atom, an alkyl group having 1 to 6 carbon atoms or a fluoroalkyl group having 1 to 6 carbon atoms;

a lithium cation;

a compound represented by the following formula (2A) and/or an acid anhydride having an aromatic ring and at least one structure represented by —C(=O)—O—C(=O)— in a molecule:

wherein R$^{13}$ and R$^{14}$ are the same or different and represent an organic group having 1 to 10 carbon atoms which may have a substituent, and R$^{13}$ and R$^{14}$ may be bonded to each other to form a ring, and Z represents O or NH; and a non-aqueous solvent;

wherein a concentration of the anion represented by the formula (1) is 0.1 mol/L or more and 1.5 mol/L or less, the non-aqueous solvent comprises a cyclic carbonate, and optionally at least one selected from the group consisting of
an ether solvent, a chain carbonate ester solvent,
an aromatic carboxylate ester solvent,
a lactone solvent,
a phosphate ester solvent,
a nitrile solvent,
a sulfur compound solvent,
an aromatic nitrile solvent,
nitromethane,
1,3-dimethyl-2-imidazolidinone,
1,3-dimethyl-3,4,5,6-tetrahydro-2(1H)-pyrimidinone, and
3-methyl-2-oxazolidinone, and
a molar ratio of the cyclic carbonate to the whole lithium cations in the non-aqueous electrolytic solution (cyclic carbonate/Li$^+$) is 1 or more and 5 or less.

2. The non-aqueous electrolytic solution according to claim 1, further comprising at least one compound selected from the group consisting of
a compound represented by the following formula (7):

$$\text{LiPF}_l(\text{C}_m\text{F}_{2m+1})_{6-l} \quad (0 \leq l \leq 6, 1 \leq m \leq 4) \tag{7}$$

a compound represented by the following formula (8):

$$\text{LiBF}_n(\text{C}_o\text{F}_{2o+1})_{4-n} \quad (0 \leq n \leq 4, 1 \leq o \leq 4) \tag{8}$$

and lithium hexafluoroarsenate.

3. The non-aqueous electrolytic solution according to claim 1, wherein the acid anhydride is a compound having a cyclic structure containing a structure represented by —C(=O)—O—C(=O)—.

4. The non-aqueous electrolytic solution according to claim 1, wherein the acid anhydride is an intramolecular dehydrocondensation product of an aromatic polyhydric carboxylic acid.

5. The non-aqueous electrolytic solution according to claim 1, wherein the compound represented by the formula (2A) is at least one compound selected from the group consisting of compounds represented by the following formulas (2A-1) to (2A-5):

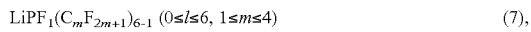
(2A-1)

wherein $R^{15}$ and $R^{16}$ are the same or different and represent a monovalent organic group having 1 to 10 carbon atoms, and Z represents O or NH;

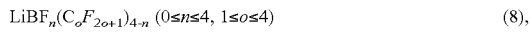
(2A-2)

wherein $R^{17}$ represents a divalent hydrocarbon group or fluorohydrocarbon group having 3 to 10 carbon atoms, $R^{18}$ represents a halogen atom or an organic group having 1 to 5 carbon atoms, p represents an integer of 0 to 3, and Z represents O or NH;

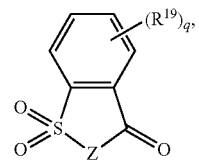
(2A-3)

wherein $R^{19}$ represents a halogen atom or an organic group having 1 to 5 carbon atoms, q represents an integer of 0 to 4, and Z represents O or NH;

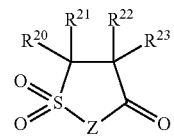
(2A-4)

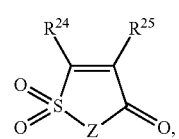
(2A-5)

wherein $R^{20}$ to $R^{25}$ are the same or different and represent a hydrogen atom, a halogen atom, or an organic group having 1 to 5 carbon atoms, and Z represents O or NH.

6. The non-aqueous electrolytic solution according to claim 1, wherein the non-aqueous electrolytic solution contains the compound represented by the formula (2A) in an amount of 0.001% by mass or more and 5% by mass or less.

7. The non-aqueous electrolytic solution according to claim 1, wherein the acid anhydride is a compound containing an aromatic ring having 6 to 10 carbon atoms.

8. A lithium ion secondary battery comprising the electrolytic solution according to claim 1.

9. The lithium ion secondary battery according to claim 8, wherein a rated charge voltage is more than 4.2 V.

10. The non-aqueous electrolytic solution according to claim 1, wherein the concentration of the anion represented by the formula (1) is 0.6 mol/L or more and 1.5 mol/L or less.

11. The non-aqueous electrolytic solution according to claim 1, wherein the acid anhydride is at least one selected from the group consisting of the following formulae (2B-1) to (2B-12):

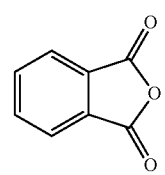
(2B-1)

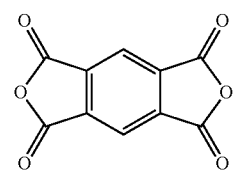
(2B-2)

(2B-3)
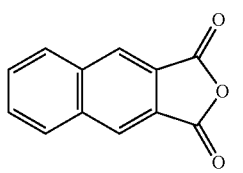
(2B-4)
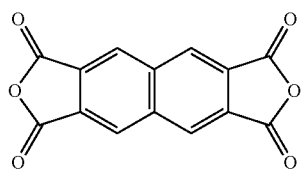
(2B-5)
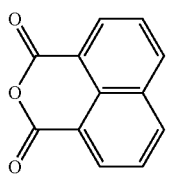
(2B-6)
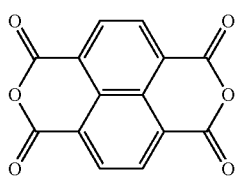
(2B-7)
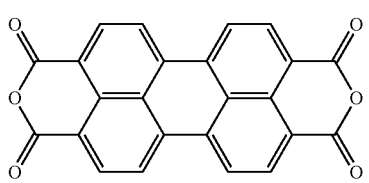
(2B-8)
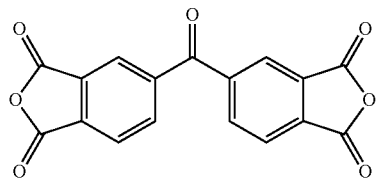
(2B-9)
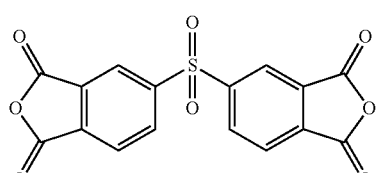
(2B-10)
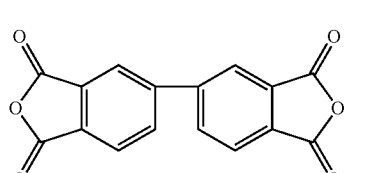
(2B-11)
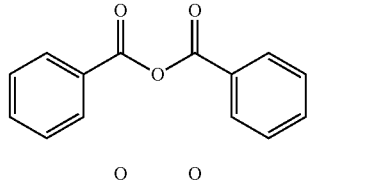
(2B-12)
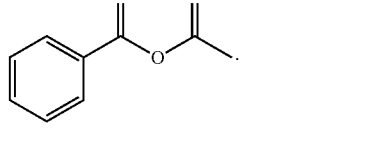
\* \* \* \* \*